(12) United States Patent
Pandya et al.

(10) Patent No.: US 6,671,724 B1
(45) Date of Patent: Dec. 30, 2003

(54) SOFTWARE, SYSTEMS AND METHODS FOR MANAGING A DISTRIBUTED NETWORK

(75) Inventors: Suketu J. Pandya, Mission Viejo, CA (US); Hariharan Lakshmanan, Sunnyvale, CA (US)

(73) Assignee: Centrisoft Corporation, Portland, OR (US)

( * ) Notice: Subject to any disclaimer, the term of this patent is extended or adjusted under 35 U.S.C. 154(b) by 0 days.

(21) Appl. No.: 09/532,101

(22) Filed: Mar. 21, 2000

(51) Int. Cl.[7] ............................................. G06F 15/173
(52) U.S. Cl. ........................ 709/226; 709/224; 370/236
(58) Field of Search ................................ 709/223, 224, 709/225, 226, 232, 229, 234, 250; 370/395, 236; 710/17, 40; 714/20

(56) References Cited

U.S. PATENT DOCUMENTS

| | | | |
|---|---|---|---|
| 5,461,611 A | | 10/1995 | Drake, Jr. et al. |
| 5,517,622 A | | 5/1996 | Ivanoff et al. |
| 5,548,579 A | | 8/1996 | Lebrun et al. |
| 5,634,006 A | | 5/1997 | Baugher et al. |
| 5,644,715 A | | 7/1997 | Baugher |
| 5,655,081 A | | 8/1997 | Bonnell et al. |
| 5,657,452 A | | 8/1997 | Kralowetz et al. |
| 5,689,708 A | * | 11/1997 | Regnier et al. ............. 709/229 |
| 5,694,548 A | | 12/1997 | Baugher et al. |
| 5,696,486 A | | 12/1997 | Poliquin et al. |
| 5,706,437 A | | 1/1998 | Kirchner et al. |
| 5,734,865 A | * | 3/1998 | Yu ............................... 709/250 |
| 5,761,428 A | | 6/1998 | Sidey |
| 5,774,656 A | | 6/1998 | Hattori et al. |
| 5,777,549 A | | 7/1998 | Arrowsmith et al. |
| 5,781,703 A | | 7/1998 | Desai et al. |
| 5,793,958 A | | 8/1998 | Clement et al. |
| 5,794,073 A | * | 8/1998 | Ramakrishnan et al. ...... 710/40 |
| 5,799,002 A | * | 8/1998 | Krishnan ..................... 370/234 |
| 5,822,521 A | | 10/1998 | Gartner et al. |

(List continued on next page.)

FOREIGN PATENT DOCUMENTS

| | | |
|---|---|---|
| WO | WO 95/27249 | 10/1995 |
| WO | WO 97/48214 | 12/1997 |
| WO | WO 98/26541 | 6/1998 |
| WO | WO 99/34544 | 7/1999 |

OTHER PUBLICATIONS

Moharpatra et al, ATM switching systems for broadband ISDN, Apr. 1997.*
Tsiotsios et al, ATM access–shaping and bandwidth–tuning of DQDB egress traffic, Sep. 1996.*
Orphanos et al., "An Integrated Application/Service Platform to Support Multimedia Applications," IEEE, pp. 1722–1726 (1994).
Lombardo et al., "A Model for Multimedia Service Creation and Activation," IEEE, pp. 1727–1733 (1994).

(List continued on next page.)

*Primary Examiner*—Mark R. Powell
*Assistant Examiner*—Thong Vu
(74) *Attorney, Agent, or Firm*—Kolisch Hartwell, P.C.

(57) ABSTRACT

Software, systems and methods for managing a distributed network environment including a plurality of computers interconnected by a network link, where at least some of the computers include a layered communications protocol stack for providing a data interface between an application program and the network link, the communications stack having a transport protocol layer for providing an end-to-end communications connection. The invention includes a control module and a plurality of agent modules, each agent being associated with one of the computers and adapted to dynamically monitor the associated computer at a data transmission point between an application program running on the computer and the transport protocol layer and repeatedly communicate with the control module in order to effect management of the distributed network system. The invented software, systems and methods may also include a messaging feature for providing users, IT personnel, or various management systems with informative messages concerning network conditions and network resources.

7 Claims, 11 Drawing Sheets

U.S. PATENT DOCUMENTS

| | | | | |
|---|---|---|---|---|
| 5,848,266 | A | * | 12/1998 | Scheurich ................... 713/503 |
| 5,881,313 | A | * | 3/1999 | Ramakrishnan et al. ...... 710/40 |
| 5,889,958 | A | | 3/1999 | Willens |
| 5,892,754 | A | | 4/1999 | Kompella et al. |
| 5,901,142 | A | | 5/1999 | Averbuch et al. |
| 5,903,568 | A | | 5/1999 | Tanaka et al. |
| 5,907,324 | A | | 5/1999 | Larson et al. |
| 5,941,947 | A | | 8/1999 | Brown et al. |
| 5,944,783 | A | | 8/1999 | Nieten |
| 5,944,795 | A | | 8/1999 | Civanlar |
| 5,948,065 | A | * | 9/1999 | Eilert et al. ................. 709/226 |
| 5,953,338 | A | * | 9/1999 | Ma et al. .................... 370/395 |
| 5,956,482 | A | | 9/1999 | Agraharam et al. |
| 5,958,010 | A | * | 9/1999 | Agarwat et al. ............ 709/224 |
| 5,968,116 | A | | 10/1999 | Day, II et al. |
| 5,978,594 | A | * | 11/1999 | Bonnell et al. ............... 710/17 |
| 5,983,261 | A | * | 11/1999 | Riddle ......................... 709/204 |
| 5,987,611 | A | | 11/1999 | Freund |
| 5,996,010 | A | | 11/1999 | Leong et al. |
| 6,018,567 | A | | 1/2000 | Dulman |
| 6,085,241 | A | * | 7/2000 | Otis ........................... 709/223 |
| 6,097,722 | A | * | 8/2000 | Graham et al. ............. 370/395 |
| 6,125,390 | A | * | 9/2000 | Touboul ..................... 709/223 |
| 6,199,124 | B1 | * | 3/2001 | Ramakrishnan et al. ...... 710/40 |
| 6,279,039 | B1 | * | 8/2001 | Bhat et al. .................. 709/226 |
| 6,400,687 | B1 | * | 6/2002 | Davison et al. ............. 370/236 |
| 6,412,000 | B1 | * | 6/2002 | Riddle et al. ............... 709/224 |
| 6,466,978 | B1 | * | 10/2002 | Mukherjee et al. ......... 709/225 |
| 6,466,980 | B1 | * | 10/2002 | Lumnelsky et al. ........ 709/226 |
| 6,502,131 | B1 | * | 12/2002 | Vaid et al. .................. 709/224 |

OTHER PUBLICATIONS

Nahrstedt et al., "The QoS Broker," IEEE, pp. 53–67 (1995).
Buddenberg, "Session Layer Requirements for Multicastinternets," IEEE, pp. 969–972 (1997).
Nishio et al., "Simplified Method for Session Coordination Using Multi–Level QoS Specification and Translation," IFIP, Ch. 38, pp. 333–344 (1997).
Youssef et al., "The Software Architecture of a Distributed Quality of Session Control Layer," IEEE, pp. 21–28 (1998).
Youssef et al., "Controlling Quality of Session in Adaptive Multimedia Multicast Systems," IEEE, pp. 160–167 (1998).
Youssef et al., "Configurable Multi–Agent System for QoS Control in WATM," IEEE, pp. 2882–2887 (1998).
Hong et al., "A CORBA–Based Quality of Service Management Framework for Distributed Multimedia Services and Applications," IEEE Network, pp. 70–79 (Mar./Apr. 1999).
Candan et al., "Least–Cost High–Quality Object Retrieval for Distributed Multimedia Collaborations," IEEE, pp. 649–654 (1999).
Cao et al., "An Architecture of Distributed Media Servers for Supporting Guaranteed QoS and Media Indexing," IEEE, pp. 1–5 (1999).
Cheong et al., "QoS Specification and Mapping for Distributed Multimedia Systems: A Survey of Issues," The Journal of Systems and Software, pp. 127–139 (1999).
Koga et al., "Interworking Architecture for Seamless Service Utilization between the TINA–Based Public Network and the Internet," 3529 SPIE 154–65 (1998).
Guedes et al., "An Agent–Based Approach for Supporting Quality of Service in Distributed Multimedia Systems," 21 Computer Communications 1269–78 (1998).
Ott et al., "An Architecture for Adaptive QoS and its Application to Multimedia Systems Design," 21 Computer Communications 334–49 (1998).
Li et al., "End–to–End QoS Support for Adaptive Applications Over the Internet," 3529 SPIE 166–76 (1998).
Alfano, "Design and Implementation of a Cooperative Multimedia Environment with QoS Control," 21 Computer Communications 350–61 (1998).
Almesberger et al., "Quality of Service Renegotiations," 3529 SPIE 124–31 (1998).

* cited by examiner

Fig. 1
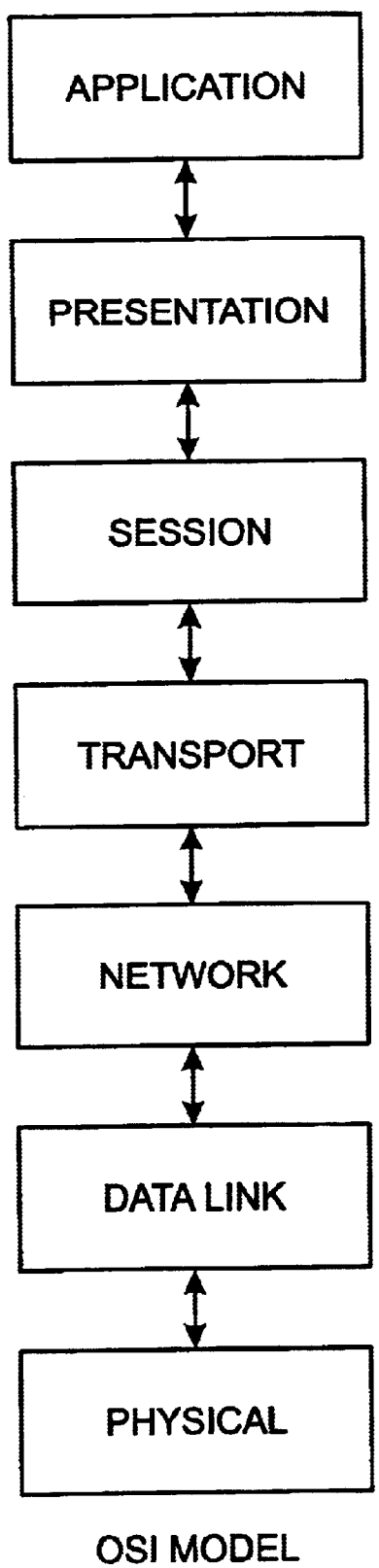
OSI MODEL
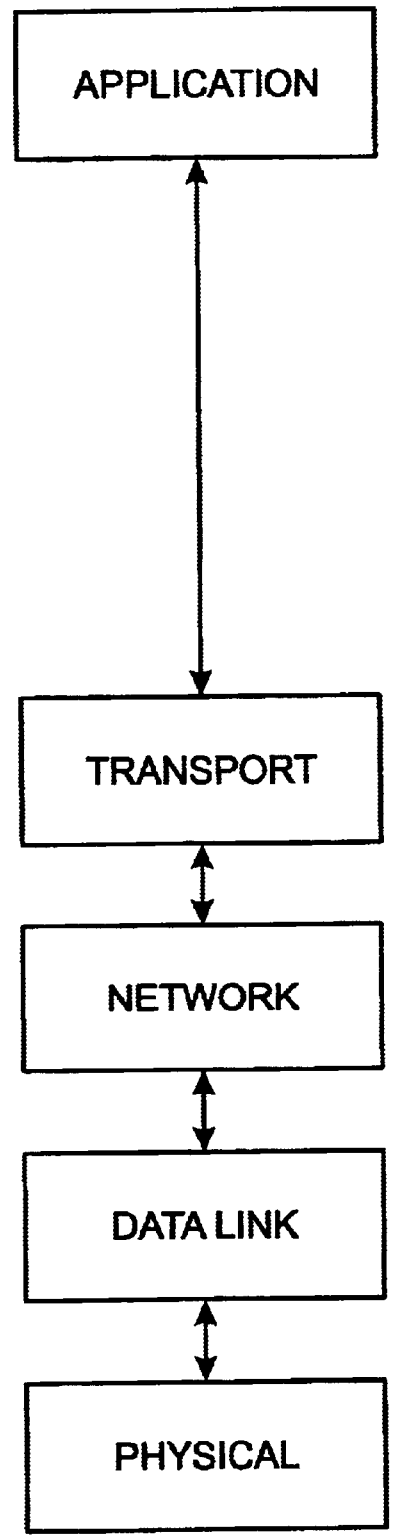
TCP/IP MODEL

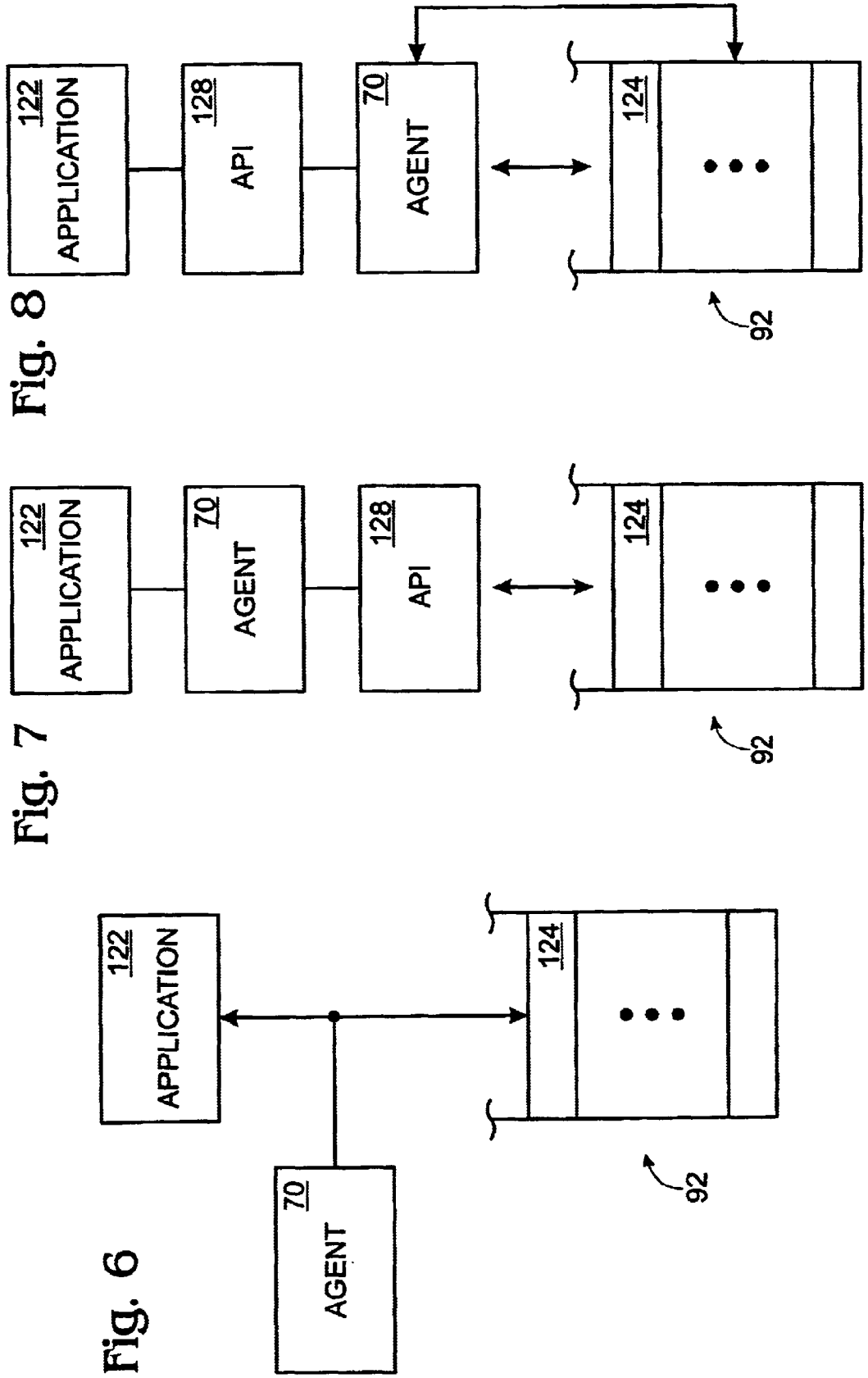

Fig. 14

| SETTINGS | STATUS |

BCP
BCP NAME: BCPNAME

TRANSMIT DOMAIN BANDWIDTH  1544  kbps

RECEIVE DOMAIN BANDWIDTH  1544  kbps

ADVANCED...

| SETTINGS | STATUS |

APPLICATION
APPLICATION NAME: APPLICATION NAME: ...

APPLICATION PRIORITY
1  2  3  4  5  6  7  8

ADVANCED BCP OPTIONS

RESOURCES
REALLOCATION INTERVAL:  5000  MILLISECONDS
REALLOCATION VALUE:  20  PERCENT
REALLOCATION RANGE:  10  PERCENT
USER UTILIZATION THRESHOLD:  80  PERCENT

TRACING
LEVEL:  1
FILE SIZE:  1  MEGABYTES
FILE COUNT:  2

OK  CANCEL

106

SOFTWARE, SYSTEMS AND METHODS FOR MANAGING A DISTRIBUTED NETWORK

FIELD OF THE INVENTION

The present invention relates generally to distributed network systems, and more particularly to software, systems and methods for managing resources of a distributed network.

BACKGROUND

Both public and private networks have shifted toward a predominantly distributed computing model, and have grown steadily in size, power and complexity. This growth has been accompanied by a corresponding increase in demands placed on information technology to increase enterprise-level productivity, operations and customer/user support. To achieve interoperability in increasingly complex network systems, TCP/IP and other standardized communication protocols have been aggressively deployed. Although many of these protocols have been effective at achieving interoperability, their widespread deployment has not been accompanied by a correspondingly aggressive development of management solutions for networks using these protocols.

Indeed, conventional computer networks provide little in the way of solutions for managing network resources, and instead typically provide what is known as "best efforts"-service to all network traffic. Best efforts is the default behavior of TCP/IP networks, in which network nodes simply drop packets indiscriminately when faced with excessive network congestion. With best efforts service, no mechanism is provided to avoid the congestion that leads to dropped packets, and network traffic is not categorized to ensure reliable delivery of more important data. Also, users are not provided with information about network conditions or underperforming resources. This lack of management frequently results in repeated, unsuccessful network requests, user frustration and diminished productivity.

Problems associated with managing network resources are intensified by the dramatic increase in the demand for these resources. New applications for use in distributed networking environments are being developed at a rapid pace. These applications have widely varying performance requirements. Multimedia applications, for example, have a very high sensitivity to jitter, loss and delay. By contrast, other types of applications can tolerate significant lapses in network performance. Many applications, particularly continuous media applications, have very high bandwidth requirements, while others have bandwidth requirements that are comparatively modest. A further problem is that many bandwidth-intensive applications are used for recreation or other low priority tasks.

In the absence of effective management tools, the result of this increased and varied competition for network resources is congestion, application unpredictability, user frustration and loss of productivity. When networks are unable to distinguish unimportant tasks or requests from those that are mission critical, network resources are often used in ways that are inconsistent with business objectives. Bandwidth may be wasted or consumed by low priority tasks. Customers may experience unsatisfactory network performance as a result of internal users placing a high load on the network.

Various solutions have been employed, with limited success, to address these network management problems. For example, to alleviate congestion, network managers often add more bandwidth to congested links. This solution is expensive and can be temporary—network usage tends to shift and grow such that the provisioned link soon becomes congested again. This often happens where the underlying cause of the congestion is not addressed. Usually, it is desirable to intelligently manage existing resources, as opposed to "over-provisioning," i.e. simply providing more resources to reduce scarcity.

A broad, conceptual class of management solutions may be thought of as attempts to increase "awareness" in a distributed networking environment. The concept is that where the network is more aware of applications or other tasks running on networked devices, and vice versa, then steps can be taken to make more efficient use of network resources. For example, if network management software becomes aware that a particular user is running a low priority application, then the software could block or limit that user's access to network resources. If management software becomes aware that the network population at a given instance includes a high percentage of outside customers, bandwidth preferences and priorities could be modified to ensure that the customers had a positive experience with the network. In the abstract, increasing application and network awareness is a desirable goal, however application vendors largely ignore these considerations and tend to focus not on network infrastructure, but rather on enhancing application functionality.

Quality of service ("QoS") and policy-based management techniques represent efforts to bridge the gap between networks, applications and users in order to more efficiently manage the use of network resources. QoS is a term referring to techniques which allow network-aware applications to request and receive a predictable level of service in terms of performance specifications such as bandwidth, jitter, delay and loss. Known QoS methods include disallowing certain types of packets, slowing transmission rates, establishing distinct classes of services for certain types of packets, marking packets with a priority value, and various queuing methods. In a distributed environment having scarce resources, QoS techniques necessarily introduce unfairness into the system by giving preferential treatment to certain network traffic.

Policy-based network management uses policies, or rules, to define how network resources are to be used. In a broad sense, a policy includes a condition and an action. An example of a policy could be to block access or disallow packets (action) if the IP source address of the data is included on a list of disallowed addresses (condition). One use of policy-based network management techniques is to determine when and how the unfairness introduced by QoS methods should apply.

Policy-based management solutions typically require that network traffic be classified before it is acted upon. The classification process can occur at various levels of data abstraction, and may be described in terms of layered communication protocols that network devices use to communicate across a network link. There are two protocol layering models which dominate the field. The first is the OSI reference model, depicted in FIG. 1. The layers of the OSI model are: application (layer 7), presentation (layer 6), session (layer 5), transport (layer 4), network (layer 3), data link (layer 2) and physical (layer 1). The second major model forms the basis for the TCP/IP protocol suite. Its layers are application, transport, network, data link and hardware, as also depicted in FIG. 1. The TCP/IP layers correspond in function to the OSI layers, but without a presentation or session layer. In both models, data is processed and changes form as it is sequentially passed between the layers.

Known policy based management solutions and QoS methods typically classify data by monitoring data flows at the transport layer and below. For example, a common multi-parameter classifier is the well known "five-tuple" consisting of (IP source address, IP destination address, IP protocol, TCP/UDP source port and TCP/UDP destination port). These parameters are all obtained at the transport and network layers of the models. The large majority of existing policy-based, QoS solutions are implemented by monitoring and classifying network activity at these protocol layers. However, the higher the protocol layer, the more definitive and specific the available data and classifiers. Because conventional policy-based, QoS systems do not employ classifiers at higher than the transport layer, they cannot employ policy-based techniques or QoS methods using the richer and more detailed data available at the higher layers. The conventional systems are thus limited in their ability to make the network more application-aware and vice versa.

In addition, the known systems for managing network resources do not effectively address the problem of bandwidth management. Bandwidth is often consumed by low priority tasks at the expense of business critical applications. In systems that do provide for priority based bandwidth allocations, the bandwidth allocations are static and are not adjusted dynamically in response to changing network conditions.

BRIEF DESCRIPTION OF THE DRAWINGS

FIG. 1 is a conceptual depiction of the OSI and TCP/IP layered protocol models.

FIG. 6 is a block diagram depicting a configuration of an agent module according to the present invention with a computing device.

FIG. 7 is a block diagram depicting another configuration of an agent module according to the present invention with a computing device.

FIG. 8 is a block diagram depicting yet another configuration of an agent module according to the present invention with a computing device.

FIG. 14 is a view of another configuration screen of the configuration utility.

FIG. 15 is a view of yet another configuration screen of the configuration utility.

FIG. 16 is a view of yet another configuration screen of the configuration utility.

DETAILED DESCRIPTION OF THE INVENTION

Figure 2:
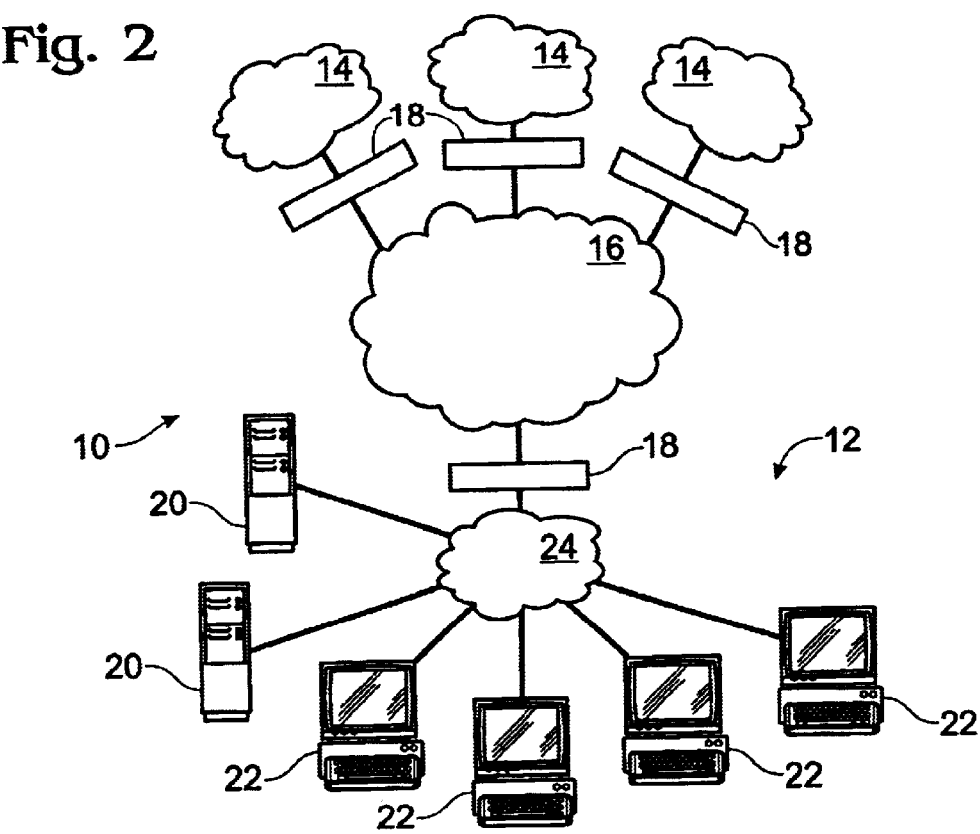
FIG. 2 is a view of a distributed network system in which the software, systems and methods of the present invention may be deployed.

The present invention provides a system and method for managing network resources in a distributed networking environment, such as distributed network 10 depicted in FIG. 2. The invented software, system and methods increase productivity and customer/user satisfaction, minimize frustration associated with using the network, and ultimately ensure that network resources are used in a way consistent with underlying business or other objectives.

The invention includes two main software components, an agent and a control module, also referred to as a control point. The agents and control points are deployed throughout distributed network 10, and interact with each other to accomplish the above goals. A plurality of agents may be deployed to intelligently couple clients, servers and other computing devices to the underlying network. The deployed agents monitor, analyze and act upon network events relating to the networked devices with which they are associated. The agents are centrally coordinated and/or controlled by one or more control points. The agents and control points interact to control and monitor network events, track operational and congestion status of network resources, select optimum targets for network requests, dynamically manage bandwidth usage, and share information about network conditions with customers, users and IT personnel.

As indicated, distributed network 10 may include a local network 12 and a plurality of remote networks 14 linked by a public network 16 such as the Internet. The local network and remote networks are connected to the public network with network infrastructure devices such as routers 18.

Local network 12 will be seen to include servers 20 and client devices such as client computers 22 interconnected by network link 24. Additionally, local network 12 may include any number and variety of devices, including file servers, applications servers, mail servers, WWW servers, databases, client computers, remote access devices, storage devices, printers and network infrastructure devices such as routers, bridges, gateways, switches, hubs and repeaters. Remote networks 14 may similarly include any number and variety of networked devices.

Indeed, virtually any type of computing device may be connected to the networks depicted in FIG. 2, including general purpose computers, laptop computers, handheld computers, wireless computing devices, mobile telephones, pagers, pervasive computing devices and various other specialty devices. Typically, many of the connected devices are general purpose computers which have at least some of the elements shown in FIG. 3, a block diagram depiction of a computer system 40. Computer system 40 includes a processor 42 that processes digital data. The processor may be a complex instruction set computing (CISC) microprocessor, a reduced instruction set computing (RISC) microprocessor, a very long instruction word (VLIW) microprocessor, a processor implementing a combination of instruction sets, a microcontroller, or virtually any other processor/controller device. The processor may be a single device or a plurality of devices.

Figure 3:
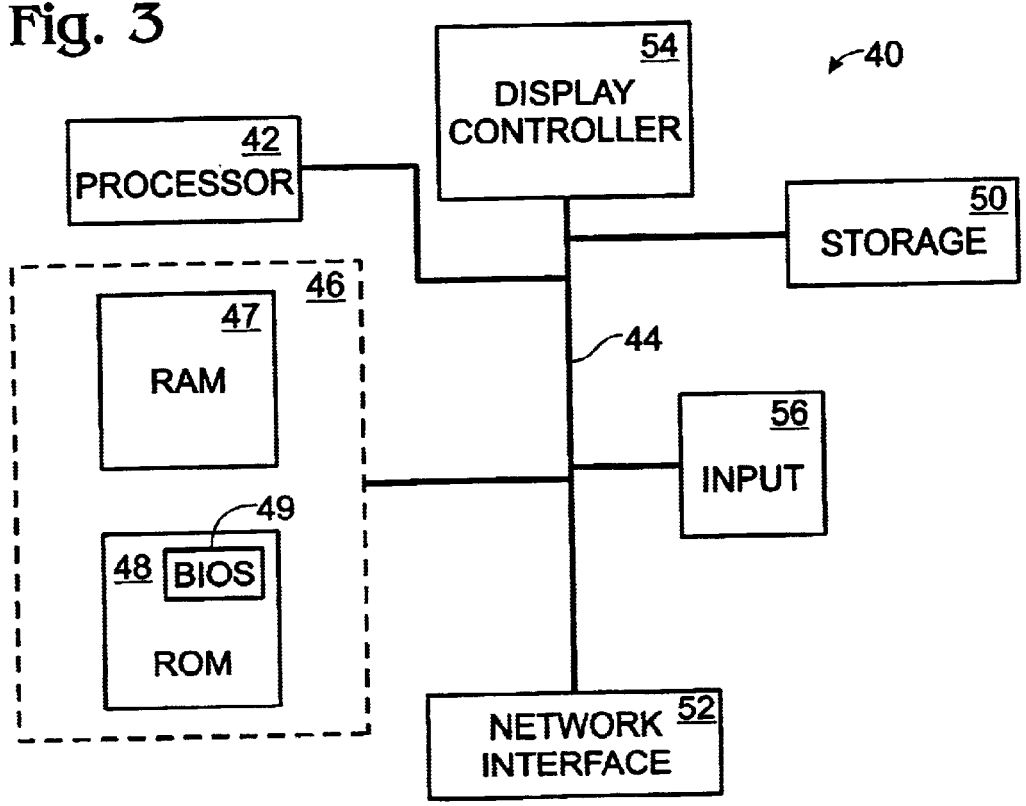
FIG. 3 is a schematic view of a computing device that may be included with the distributed network system of FIG. 2.

Referring still to FIG. 3, it will be noted that processor 42 is coupled to a bus 44 which transmits signals between the processor and other components in the computer system. Those skilled in the art will appreciate that the bus may be a single bus or a plurality of buses. A memory 46 is coupled to bus 44 and comprises a random access memory (RAM) device 47 (referred to as main memory) that stores information or other intermediate data during execution by processor 42. Memory 46 also includes a read only memory (ROM) and/or other static storage device 48 coupled to the bus that stores information and instructions for processor 42. A basic input/output system (BIOS) 49, containing the basic routines that help to transfer information between elements of the computer system, such as during start-up, is stored in ROM 48. A data storage device 50 also is coupled to bus 44 and stores information and instructions. The data storage device may be a hard disk drive, a floppy disk drive, a CD-ROM device, a flash memory device or any other mass storage device. In the depicted computer system, a network interface 52 also is coupled to bus 44. The network interface operates to connect the computer system to a network (not shown).

Computer system 40 may also include a display device controller 54 coupled to bus 44. The display device controller allows coupling of a display device to the computer system and operates to interface the display device to the computer system. The display device controller 54 may be, for example, a monochrome display adapter (MDA) card, a color graphics adapter (CGA) card, or other display device controller. The display device (not shown) may be a television set, a computer monitor, a flat panel display or other display device. The display device receives information and data from processor 42 through display device controller 54 and displays the information and data to the user of computer system 40.

An input device 56, including alphanumeric and other keys, typically is coupled to bus 44 for communicating information and command selections to processor 42. Alternatively, input device 56 is not directly coupled to bus 44, but interfaces with the computer system via infra-red coded signals transmitted from the input device to an infra-red receiver in the computer system (not shown). The input device may also be a remote control unit having keys that select characters or command selections on the display device.

The various computing devices coupled to the networks of FIG. 2 typically communicate with each other across network links using communications software employing various communications protocols. The communications software for each networked device typically consists of a number of protocol layers, through which data is sequentially transferred as it is exchanged across a network link between devices. FIG. 1 respectively depicts the OSI layered protocol model and a layered model based on the TCP/IP suite of protocols. These two models dominate the field of network communications software. As seen in the figure, the OSI model has seven layers, including an application layer, a presentation layer, a session layer, a transport layer, a network layer, a data link layer and a physical layer. The TCP/IP-based model includes an application layer, a transport layer, a network layer, a data link layer and a physical layer.

Each layer in the models plays a different role in network communications. Conceptually, all of the protocol layers lie in a data transmission path that is "between" an application program running on the particular networked device and the network link, with the application layer being closest to the application program. When data is transferred from an application program running on one computer across the network to an application program running on another computer, the data is transferred down through the protocol layers of the first computer, across the network link, and then up through the protocol layers on the second computer.

In both of the depicted models, the application layer is responsible for interacting with an operating system of the networked device and for providing a window for application programs running on the device to access the network. The transport layer is responsible for providing reliable, end-to-end data transmission between two end points on a network, such as between a client device and a server computer, or between a web server and a DNS server. Depending on the particular transport protocol, transport functionality may be realized using either connection-oriented or connectionless data transfer. The network layer typically is not concerned with end-to-end delivery, but rather with forwarding and routing data to and from nodes between endpoints. The layers below the transport and network layers perform other functions, with the lowest levels addressing the physical and electrical issues of transmitting raw bits across a network link.

The present invention is applicable to a wide variety of network environments employing communications protocols adhering to either of the layered models depicted in FIG. 1, or to any other layered model. Furthermore, the invention is applicable to any type of network topology, and to networks using both physical and wireless connections.

Figure 4:
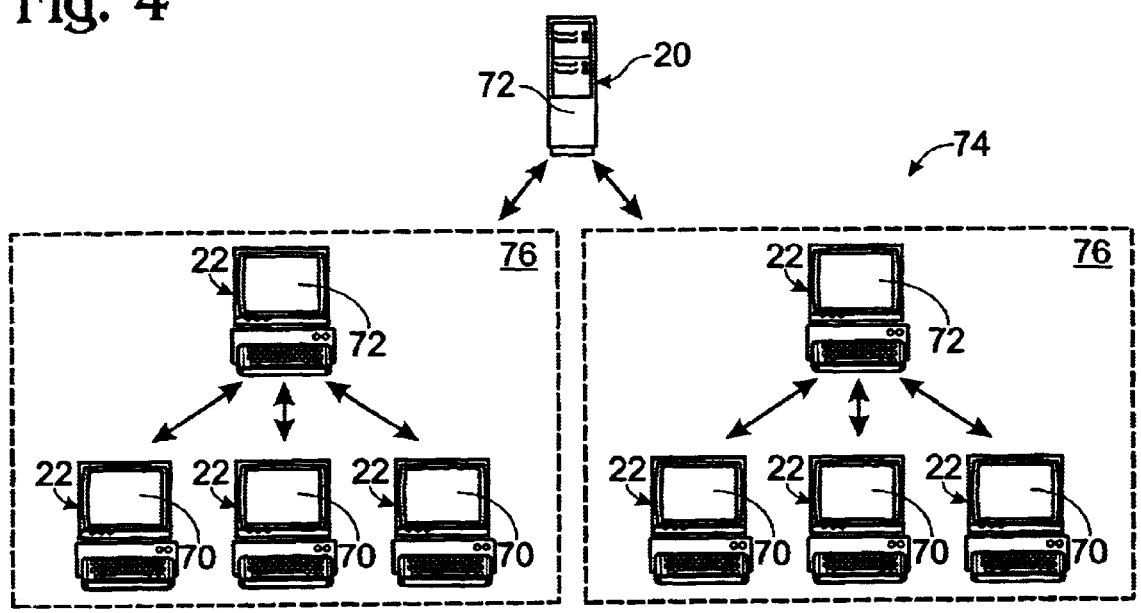
FIG. 4 is a block diagram view depicting the relationship between the distributed agent modules and control modules of the present invention, and depicting the relationship between the computing devices with which the agent and control modules are associated.

The present invention provides software, systems and methods for managing the resources of an enterprise network, such as that depicted in FIG. 2. This is accomplished using two main interacting software components, an agent and a control point, both of which are adapted to run on, or be associated with, computing devices such as the computing device described with reference to FIG. 3. As seen in FIG. 4, a plurality of agents 70 and one or more control points 72 may be deployed throughout distributed network 74 by loading the agent and control point software modules on networked computing devices such as clients 22 and server 20. As will be discussed in detail, the agents and control points may be adapted and configured to enforce system policies; to monitor and analyze network events, and take appropriate action based on these events; to provide valuable information to users of the network; and ultimately to ensure that network resources are efficiently used in a manner consistent with underlying business or other goals.

The invented software, systems and methods may be configured using a third software component, to be later discussed in more detail with reference to FIGS. 5 and 13–16. Typically, this configuration utility is a platform-independent application that provides a graphical user interface for centrally managing configuration information for the control points and agents. In addition, the configuration utility may be adapted to communicate and interface with other management systems, including management platforms supplied by other vendors.

As indicated in FIG. 4, each control point 72 is typically associated with multiple agents 70, and the associated agents are referred to as being within a domain 76 of the particular control point. The control points coordinate and control the activity of the distributed agents within their domains. In addition, the control points monitor the status of network resources, and share this information with management and support systems and with the agents.

Control points 72 and agents 70 may be flexibly deployed in a variety of configurations. For example, each agent may be associated with a primary control point and one or more backup control points that will assume primary control if necessary. Such a configuration is illustrated in FIG. 4, where control points 72 within the dashed lines function as primary connections, with the control point associated with server device 20 functioning as a backup connection for all of the depicted agents. In addition, the invented management solution may be deployed so that one control point coordinates and controls the activity of a single domain, or of multiple domains. Alternatively, one domain may be controlled and coordinated by the cooperative activity of multiple control points. In addition, agents may be configured to have embedded control point functionality, and may therefore operate without an associated control point entity.

The agents monitor network resources and the activity of the device with which they are associated, and communicate this information to the control points. In response to monitored network conditions and data reported by agents, the control points alter the behavior of particular agents in order to provide the desired network services. The control points and agents may be loaded on a wide variety of devices, including general purpose computers, servers, routers, hubs, palm computers, pagers, cellular telephones, and virtually any other networked device having a processor and memory. Agents and control points may reside on separate devices, or simultaneously on the same device.

Figure 5:
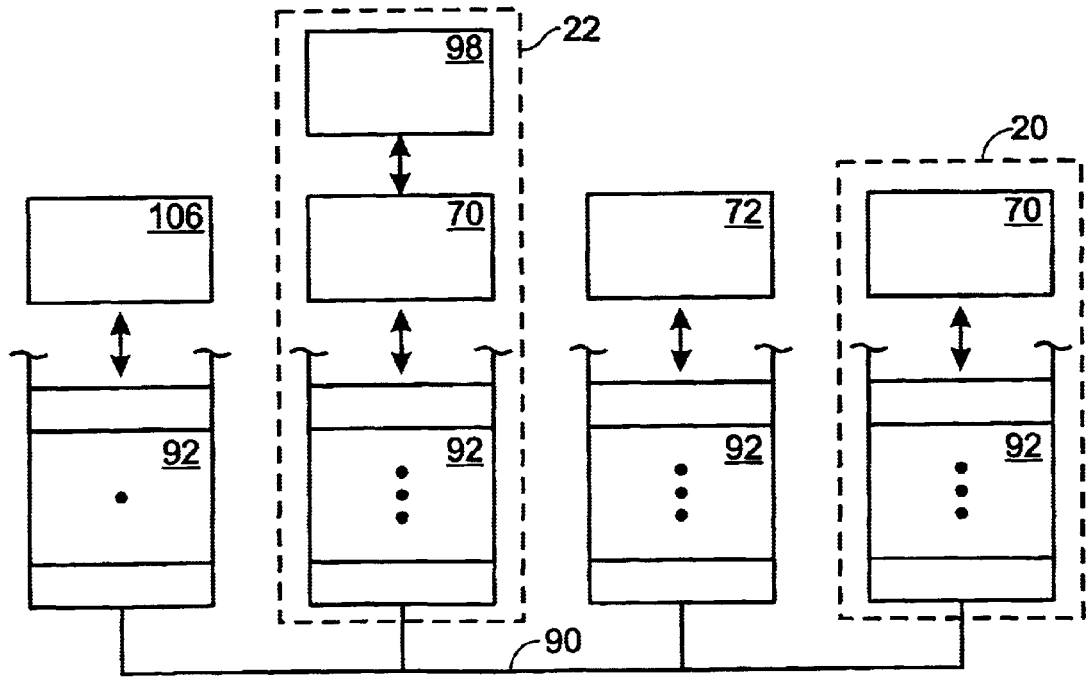
FIG. 5 is a block diagram view depicting various components of the invented software, system and methods, including two agent modules, a control module and a configuration utility, the diagram also depicting the interconnection of the components with layered communications protocol software and a network link.

FIG. 5 illustrates an example of the way in which the various components of the invented software, systems and methods may be physically interconnected with a network link 90. The components are all connected to network link 90 by means of layered communications protocol software 92. The components communicate with each other via the communications software and network link. As will be appreciated by those skilled in the art, network link 90 may be a physical or wireless connection, or a series of links including physical and wireless segments. More specifically, the depicted system includes an agent 70 associated with a client computing device 22, including an application program 98. Another agent is associated with server computing device 20. The agents monitor the activity of their associated computing devices and communicate with control point 72. Configuration utility 106 communicates with all of the other components, and with other management systems, to configure the operation of the various components and monitor the status of the network.

The system policies that define how network resources are to be used may be centrally defined and tailored to most efficiently achieve underlying goals. Defined policies are accessed by the control points, which in turn communicate various elements and parameters associated with the policies to the agents within their domain. At a very basic level, a policy contains rules about how network resources are to be used, with the rules containing conditions and actions to be taken when the conditions are satisfied. The agents and control points monitor the network and devices connected to the network to determine when various rules apply and whether the conditions accompanying those rules are satisfied. Once the agents and/or control points determine that action is required, they take the necessary action(s) to enforce the system policies.

For example, successful businesses often strive to provide excellent customer services. This underlying business goal can be translated into many different policies defining how network resources are to be used. One example of such a policy would be to prevent or limit access to non-business critical applications when performance of business critical applications is degraded beyond a threshold point. Another example would be to use QoS techniques to provide a guaranteed or high level of service to e-commerce applications. Yet another example would be to dynamically increase the network bandwidth allocated to a networked computer whenever it is accessed by a customer. Also, bandwidth for various applications might be restricted during times when there is heavy use of network resources by customers.

Control points 72 would access these policies and provide policy data to agents 70. Agents 70 and control points 72 would communicate with each other and monitor the network to determine how many customers were accessing the network, what computers the customer(s) were accessing, and what applications were being accessed by the customers. Once the triggering conditions were detected, the agents and control points would interact to re-allocate bandwidth, provide specified service levels, block or restrict various non-customer activities, etc.

Another example of policy-based management would be to define an optimum specification of network resources or service levels for particular types of network tasks. The particular policies would direct the management entities to determine whether the particular task was permitted, and if permitted, the management entities would interact to ensure that the desired level of resources was provided to accomplish the task. If the optimum resources were not available, the applicable policies could further specify that the requested task be blocked, and that the requesting user be provided with an informative message detailing the reason why the request was denied. Alternatively, the policies could specify that the user be provided with various options, such as proceeding with the requested task, but with sub-optimal resources, or waiting to perform the task until a later time.

For example, continuous media applications such as IP telephony have certain bandwidth requirements for optimum performance, and are particularly sensitive to network jitter and delay. Policies could be written to specify a desired level of service, including bandwidth requirements and threshold levels for jitter and delay, for client computers attempting to run IP telephony applications. The policies would further direct the agents and control modules to attempt to provide the specified level of service. Security checking could also be included to ensure that the particular user or client computer was permitted to run the application. In the event that the specified service level could not be provided, the requesting user could be provided with a message indicating that the resources for the request were not available. The user could also be offered various options, including proceeding with a sub-optimal level of service, placing a conventional telephone call, waiting to perform the task until a later time, etc.

The software, system and methods of the present invention may be used to implement a wide variety of system policies. The policy rules and conditions may be based on any number of parameters, including IP source address, IP destination address, source port, destination port, protocol, application identity, user identity, device identity, URL, available device bandwidth, application profile, server profile, gateway identity, router identity, time-of-day, network congestion, network load, network population, available domain bandwidth and resource status, to name but a partial list. The actions taken when the policy conditions are satisfied can include blocking network access, adjusting service levels and/or bandwidth allocations for networked devices, blocking requests to particular URLs, diverting network requests away from overloaded or underperforming resources, redirecting network requests to alternate resources and gathering network statistics.

Some of the parameters listed above may be thought of as "client parameters," because they are normally evaluated by an agent monitoring a single networked client device. These include IP source address, IP destination address, source port, destination port, protocol, application identity, user identity, available device bandwidth and URL. Other parameters, such as application profile, server profile, gateway identity, router identity, time-of-day, network congestion, network load, network population, available domain bandwidth and resource status may be though of as "system parameters" because they pertain to shared resources, aggregate network conditions or require evaluation of data from multiple agent modules. Despite this, there is not a precise distinction between client parameters and system parameters. Certain parameters, such as time-of-day, may be considered either a client parameter or a system parameter, or both.

Policy-based network management, QoS implementation, and the other functions of the agents and control points depend on obtaining real-time information about the network. As will be discussed, the present invention is an improvement over known policy-based QoS management solutions because of the enhanced ability to obtain detailed information about network conditions and the activity of networked devices. Many of the policy parameters and conditions discussed above are accessible in the present invention due to the particular way the agent modules are coupled to the communications software of their associated devices. Also, as the above examples suggest, managing bandwidth and ensuring its availability for core applications is an increasingly important consideration in managing networks. The present invention provides an improved system and method for dynamically allocating bandwidth and controlling bandwidth usage in response to changing network conditions.

The ability of the present invention to flexibly deploy policy-based, QoS management solutions based on detailed information about network conditions has a number of significant benefits. These benefits include reducing frustration associated with using the network, reducing help calls to IT personnel, increasing productivity, lowering business costs associated with managing and maintaining enterprise networks, and increased customer/user loyalty and satisfaction. Ultimately, the invented systems and methods ensure that network resources are used in a way that is consistent with underlying goals and objectives.

The ability of the present invention to implement policy-based QoS between the application and transport layers has another advantage. This allows support for encryption and other security implementations carried out using Virtual Private Networking (VPN) or IPSec protocol.

Referring now to FIGS. 6–9, the agent module will be more particularly described. The basic functions of the agent module are monitoring the status and activities of its associated client, server, pervasive computing device or other computing device, communicating this information to one or more control points, enforcing system policies under the direction of the control points, and providing messages to network users and administrators concerning network conditions. FIGS. 6–8 are conceptual depictions of networked computing devices, and show how the agent software is associated with the networked devices relative to layered protocol software used by the devices for network communication.

As seen in FIG. 6, agent 70 is interposed between application program 122 and a communications protocol layer for providing end-to-end data transmission, such as transport layer 124 of communications protocol stack 92. Typically, the agent modules of the present invention are used with network devices that employ layered communications software adhering to either the OSI or TCP/IP-based protocol models. Thus, agent 70 is depicted as "interposed," i.e. in a data path, between an application program and a transport protocol layer. However, it will be appreciated by those skilled in the art that the invented agent may be used with protocol software not adhering to either the OSI or TCP/IP models, but that nonetheless includes a protocol layer providing transport functionality, i.e. providing for end-to-end data transmission.

Because of the depicted position within the data path, agent 70 is able to monitor network traffic and obtain information that is not available by hooking into transport layer 124 or the layers below the transport layer. At the higher layers, the available data is richer and more detailed. Hooking into the stack at higher layers allows the network to become more "application-aware" than is possible when monitoring occurs at the transport and lower layers.

The agent modules may be interposed at a variety of points between application program 122 and transport layer 124. Specifically, as shown in FIGS. 7 and 8, agent 70 may be associated with a client computer so that it is adjacent an application programming interface (API) adapted to provide a standardized interface for application program 122 to access a local operating system (not shown) and communications stack 92. In FIG. 7, agent 70 is adjacent a winsock API 128 and interposed between application program 122 and the winsock interface. FIG. 8 shows an alternate configuration, in which agent 70 is again adjacent the winsock interface, but the winsock interface is interposed between application program 122 and agent 70. With either configuration, the agent is interposed between the transport layer 124 of communications stack 92 and is adapted to directly monitor data received by or sent from the winsock interface.

As shown in FIG. 8, agent 70 may be configured to hook into lower layers of communications stack 92. This allows the agent to accurately monitor network traffic volumes by providing a correction mechanism to account for data compression or encryption occurring at protocol layers below transport layer 124. For example, if compression or encryption occurs within transport layer 124, monitoring at a point above the transport layer would yield an inaccurate measure of the network traffic associated with the computing device. Hooking into lower layers with agent 70 allows network traffic to be accurately measured in the event that compression, encryption or other data processing that qualitatively or quantitatively affects network traffic occurs at lower protocol layers.

Figure 9:
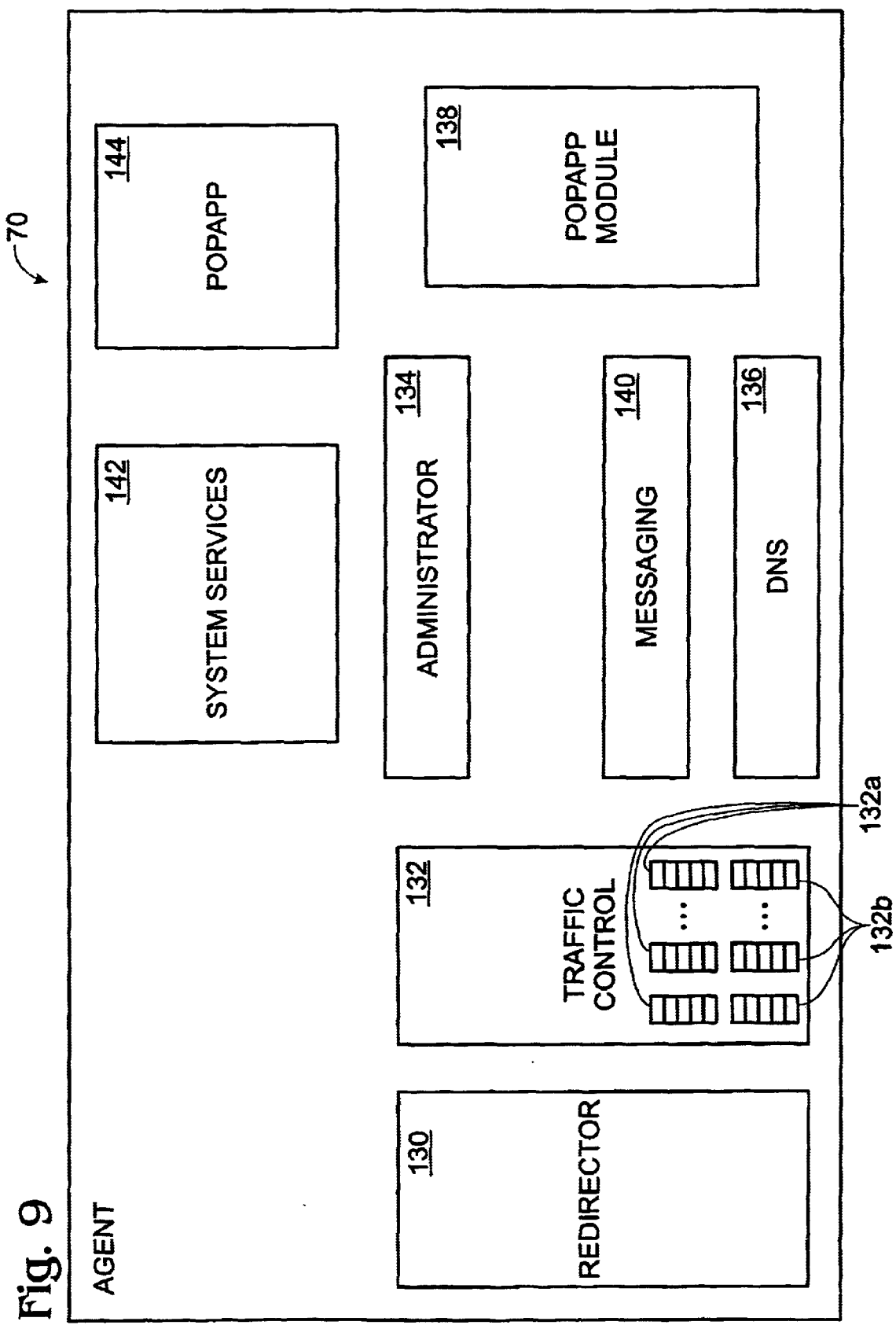
FIG. 9 is a block diagram depicting various component parts of an embodiment of an agent module according to the present invention.

An embodiment of the agent module is depicted in FIG. 9. As shown, agent 70 may include a redirector module 130, a traffic control module 132, an administrator module 134, a DNS module 136, a popapp module 138, a message broker module 140, a system services module 142, and a popapp 144. Redirector module 130 intercepts winsock API calls made by applications running on networked devices such as the client computers depicted in FIGS. 2 and 3. Redirector module 130 then hands these calls to one or more of the other agent components for processing. As discussed with reference to FIGS. 6–8, redirector module is positioned to allow the agent to monitor data at a data transmission point between an application program running on the device and the transport layer of the communications stack. Depending on the configuration of the agent and control point, the intercepted winsock calls may be rejected, changed, or passed on by agent 70.

Traffic control module 132 implements QoS and system policies and assists in monitoring network conditions. Traffic control module 132 implements QoS methods by controlling the network traffic flow between applications running on the agent device and the network link. The traffic flow is controlled to deliver a specified network service level, which may include specifications of bandwidth, data throughput, jitter, delay and data loss.

To provide the specified network service level, traffic control module 132 may maintain a queue or plurality of queues. When data is sent from the client to the network, or from the network to the client, redirector module 130 intercepts the data, and traffic module 132 places the individual units of data in the appropriate queue. The control points may be configured to periodically provide traffic control commands, which may include the QoS parameters and service specifications discussed above. In response, traffic control module 132 controls the passing of data into, through or out of the queues in order to provide the specified service level.

More specifically, the outgoing traffic rate may be controlled using a plurality of priority-based transmission queues, such as transmission queues 132*a*. When an application or process is invoked by a computing device with which agent 70 is associated, a priority level is assigned to the application, based on centrally defined policies and priority data supplied by the control point. Specifically, as will be discussed, the control points maintain user profiles, applications profiles and network resource profiles. These profiles include priority data which is provided to the agents.

Transmission queues 132*a* may be configured to release data for transmission to the network at regular intervals. Using the parameters specified in traffic control commands issued by a control point, traffic module 132 calculates how much data can be released from the transmission queues in a particular interval. For example, if the specified average traffic rate is 100 KBps and the queue release interval is 1 ms, then the total amount of data that the queues can release in a given interval is 100 bits. The relative priorities of the queues containing data to be transmitted determine how much of the allotment may be released by each individual queue. For example, assuming there are only two queues, Q1 and Q2, that have data queued for transmission, Q1 will be permitted to transmit 66.66% of the overall allotted interval release if its priority is twice that of Q2. Q2 would only be permitted to release 33.33% of the allotment. If their priorities were equal, each queue would be permitted to release 50% of the interval allotment for forwarding to the network link.

If waiting data is packaged into units that are larger than the amount a given queue is permitted to release, the queue accumulates "credits" for intervals in which it does not release any waiting data. When enough credits are accumulated, the waiting message is released for forwarding to the network.

Similarly, to control the rate at which network traffic is received, traffic control module 132 may be configured to maintain a plurality of separate receive queues, such as receive queues 132*b*. In addition to the methods discussed above, various other methods may be employed to control the rate at which network traffic is sent and received by the queues. Also, the behavior of the transmit and receive queues may be controlled through various methods to control jitter, delay, loss and response time for network connections.

The transmit and receive queues may also be configured to detect network conditions such as congestion and slow responding applications or servers. For example, for each application, transmitted packets or other data units may be timestamped when passed out of a transmit queue. When corresponding packets are received for a particular application, the receive and send times may be compared to detect network congestion and/or slow response times for various target resources. This information may be reported to the control points and shared with other agents within the domain. The response time and other performance information obtained by comparing transmit and receive times may also be used to compile and maintain statistics regarding various network resources.

Using this detection and reporting mechanism, a control point may be configured to reduce network loads by instructing traffic control module 132 to close low priority sessions and block additional sessions whenever heavy network congestion is reported by one of the agents. In conjunction, as will be explained, popapp 138 module may provide a message to the user explaining why sessions are being closed. In addition to closing the existing sessions, the control point may be configured to instruct the agents to block any further sessions. This action may also be accompanied by a user message in response to attempts to launch a new application or network process. When the network load is reduced, the control point will send a message to the agents allowing sessions.

In addition to identifying congestion and slow response times, traffic control module 132 may be more generally configured to aid in identifying downed or under-performing network resources. When a connection to a target resource fails, traffic module 132 notifies popapp modules 138, which in turn launches an executable to perform a root-cause analysis of the problem. Agent 70 then provides the control point with a message identifying the resource and its status, if possible.

In addition, when a connection fails, popapp module 138 may be configured to provide a message to the user, including an option to initiate an autoconnect routine targeting the unavailable resource. Enabling autoconnect causes the agent to periodically retry the unavailable resource. This feature may be disabled, if desired, to allow the control point to assume responsibility for determining when the resource becomes available again. As will be later discussed, the invented system may be configured so that the control modules assume responsibility for monitoring unavailable resources in order to minimize unnecessary network traffic.

As discussed below, various agent components also monitor network conditions and resource usage for the purpose of compiling statistics. An additional function of traffic control module 132 is to aid in performing these functions by providing information to other agent components regarding accessed resources, including resource performance and frequency of access.

As suggested in the above discussion of traffic control module 132, popapp module 138 stores and is responsible for launching a variety of small application modules such as application 144, known as popapps, to perform various operations and enhance the functioning of the invented system. Popapps detect and diagnose network conditions such as downed resources, provide specific messages to users and IT personnel regarding errors and network conditions, and interface with other information management, reporting or operational support systems, such as policy managers, service level managers, and network and system management platforms. Popapps may be customized to add features to existing products, to tailor products for specific customer needs, and to integrate the invented software, systems and methods with technology supplied by other vendors.

Administrator module 134 interacts with various other agent modules, maintains and provides network statistics, and provides an interface for centrally configuring agents and other components of the invented system. With regard to agent configuration, administrator module 134 interfaces with configuration utility 106 (shown in FIGS. 5 and 13–16), in order to configure various agent parameters. Administrator module 134 also serves as a repository for local reporting and statistics information to be communicated to the control points. Based on information obtained by other agent modules, administrator module 134 maintains local information regarding accessed servers, DNS servers, gateways, routers, switches, applications and other resources. This information is communicated on request to the control point, and may be used for network planning or to dynamically alter the behavior of agents. In addition, administrator module 134 stores system policies and/or components of policies, and provides policy data to various agent components as needed to implement and enforce the policies. Administrator module 134 also includes support for interfacing the invented system with standardized network management protocols and platforms.

DNS module 136 provides the agent with configurable address resolving services. DNS module 136 may include a local cache of DNS information, and may be configured to first resolve address requests using this local cache. If the request cannot be resolved locally, the request is submitted to a control point, which resolves the address with its own cache, provided the address is in the control point cache and the user has permission to access the address. If the request cannot be resolved with the control point cache, the connected control point submits the request to a DNS server for resolution. If the address is still not resolved at this point, the control point sends a message to the agent, and the agent then submits the request directly to its own DNS server for resolution.

DNS module 136 also monitors address requests and shares the content of the requests with administrator module 134. The requests are locally compiled and ultimately provided to the control points, which maintain dynamically updated lists of the most popular DNS servers. In addition, DNS module 136 is adapted to interact with control point 72 in order to redirect address resolving requests and other network requests to alternate targets, if necessary.

Message broker module 140 creates and maintains connections to the one or more control points with which the agent interacts. The various agent components use the message broker module to communicate with each other and with a connected control point. Message broker module 140 includes message creator and message dispatcher processes for creating and sending messages to the control points. The message creator process includes member functions, which create control point messages by receiving message contents as parameters and encoding the contents in a standard network format. The message creator process also includes a member function to decode the messages received from the control point and return the contents in a format usable by the various components of the agent.

After encoding by the creator process, control point messages are added to a transmission queue and extracted by the message dispatcher function for transmission to the control point. Messages extracted from the queue are sent to the agent's active control point. In addition, the dispatcher may be configured to ensure delivery of the message using a sequence numbering scheme or other error detection and recovery methods.

Messages and communications from an agent to a control point are made using a unicast addressing mechanism. Communications from the control point to an agent or agents may be made using unicast or a multicast addressing scheme. When configured for multicast operation, the control point and agents may be set to revert to unicast to allow for communication with devices that do not support IP multicast.

Once a connection with a control point is established, message broker module 140 monitors the status of the connection and switches over to a backup control point upon detecting a connection failure. If both the active and backup connections are not active, network traffic is passed on transparently.

System services module 142 provides various support functions to the other agent components. First, system services module maintains dynamic lists of user profiles, server profiles, DNS server profiles, control point connections and other data. The system services module also provides a tracing capability for debugging, and timer services for use by other agent components. System services module may also be configured with a library of APIs to interface the agent with the operating systems and other components of the device that the agent is associated with.

Figure 10:
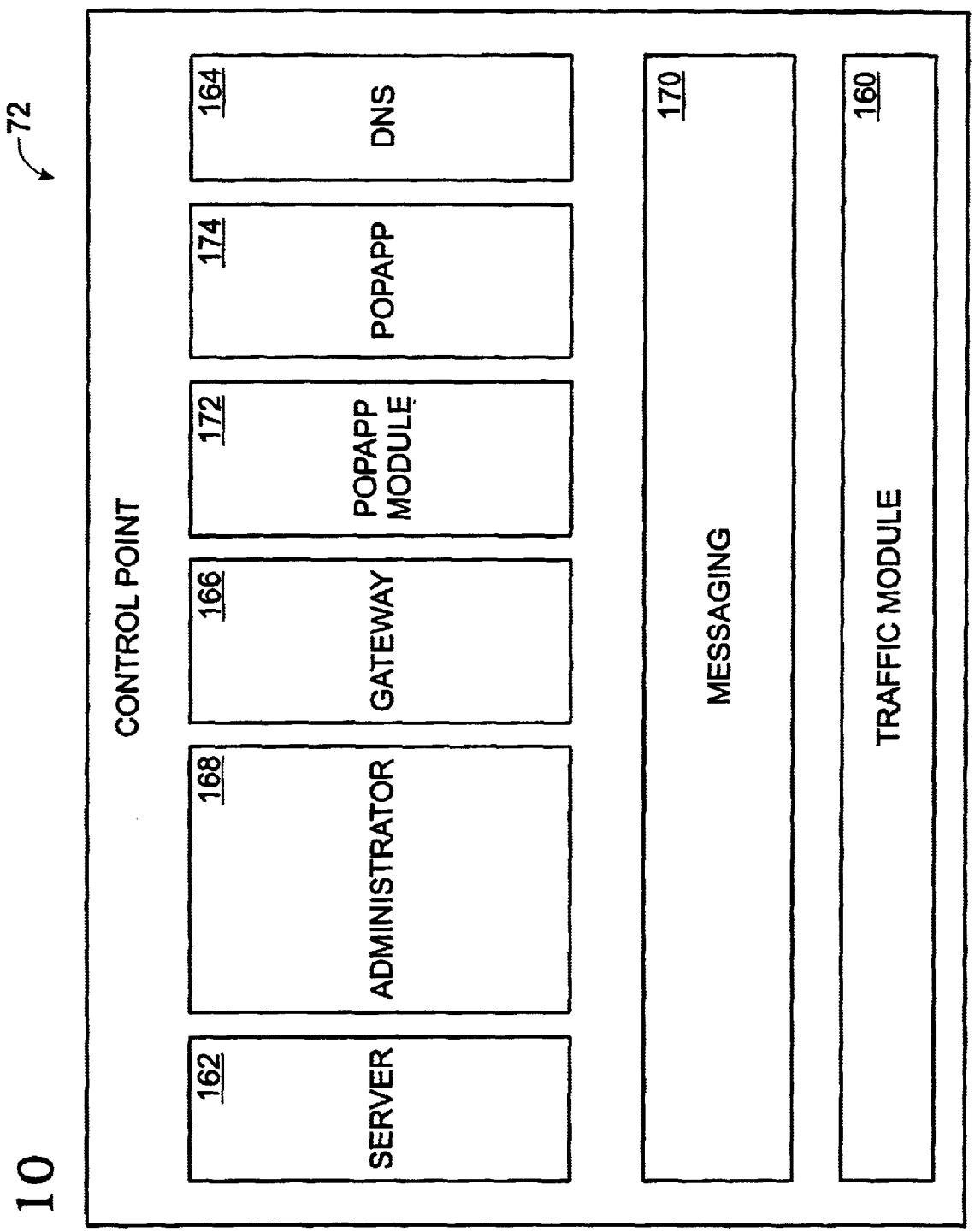
FIG. 10 is a block diagram depicting various component parts of an embodiment of a control module according to the present invention.
Figure 11B:
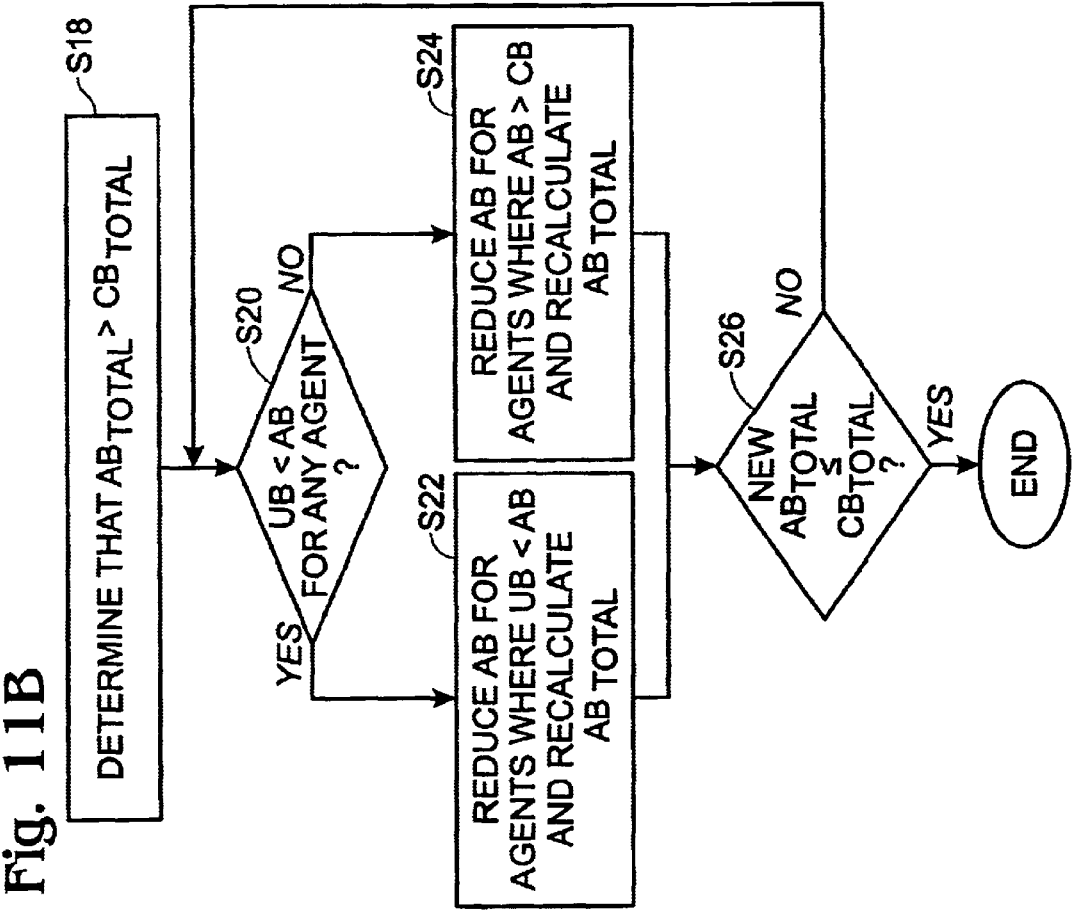
FIG. 11B is a flowchart depicting another method according to the present invention for allocating bandwidth among a plurality of computers.
Figure 11A:
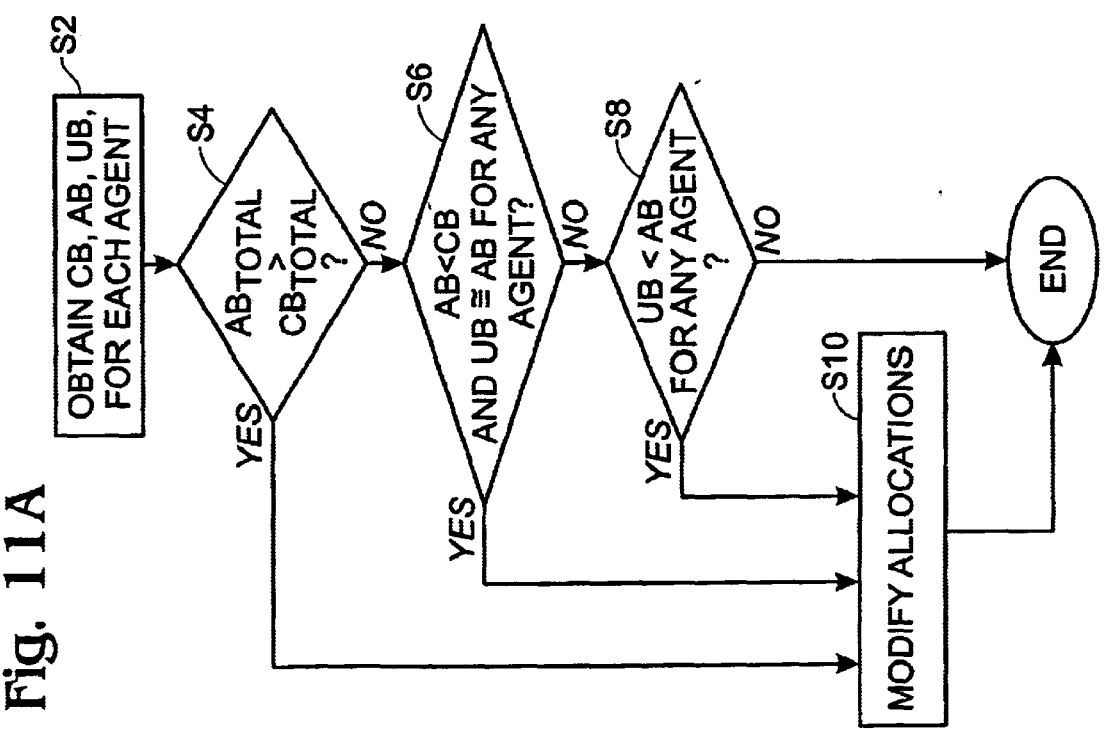
FIG. 11A is a flowchart depicting a method according to the present invention for allocating bandwidth among a plurality of computers.
Figure 11D:
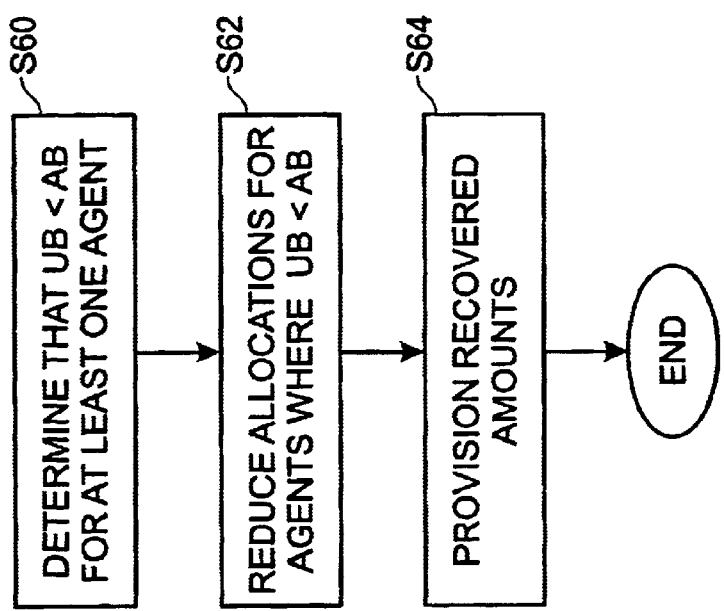
FIG. 11D is a flowchart depicting yet another method according to the present invention for allocating bandwidth among a plurality of computers.
Figure 11C:
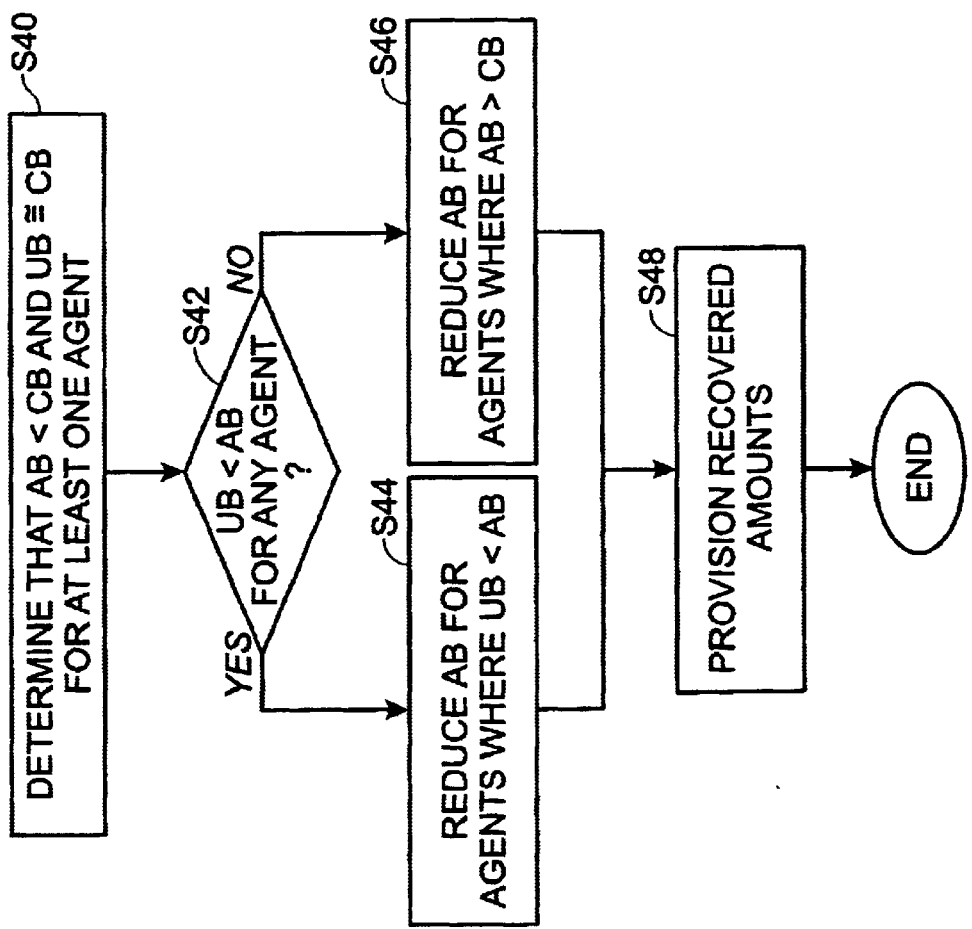
FIG. 11C is a flowchart depicting yet another method according to the present invention for allocating bandwidth among a plurality of computers.
Figure 12:
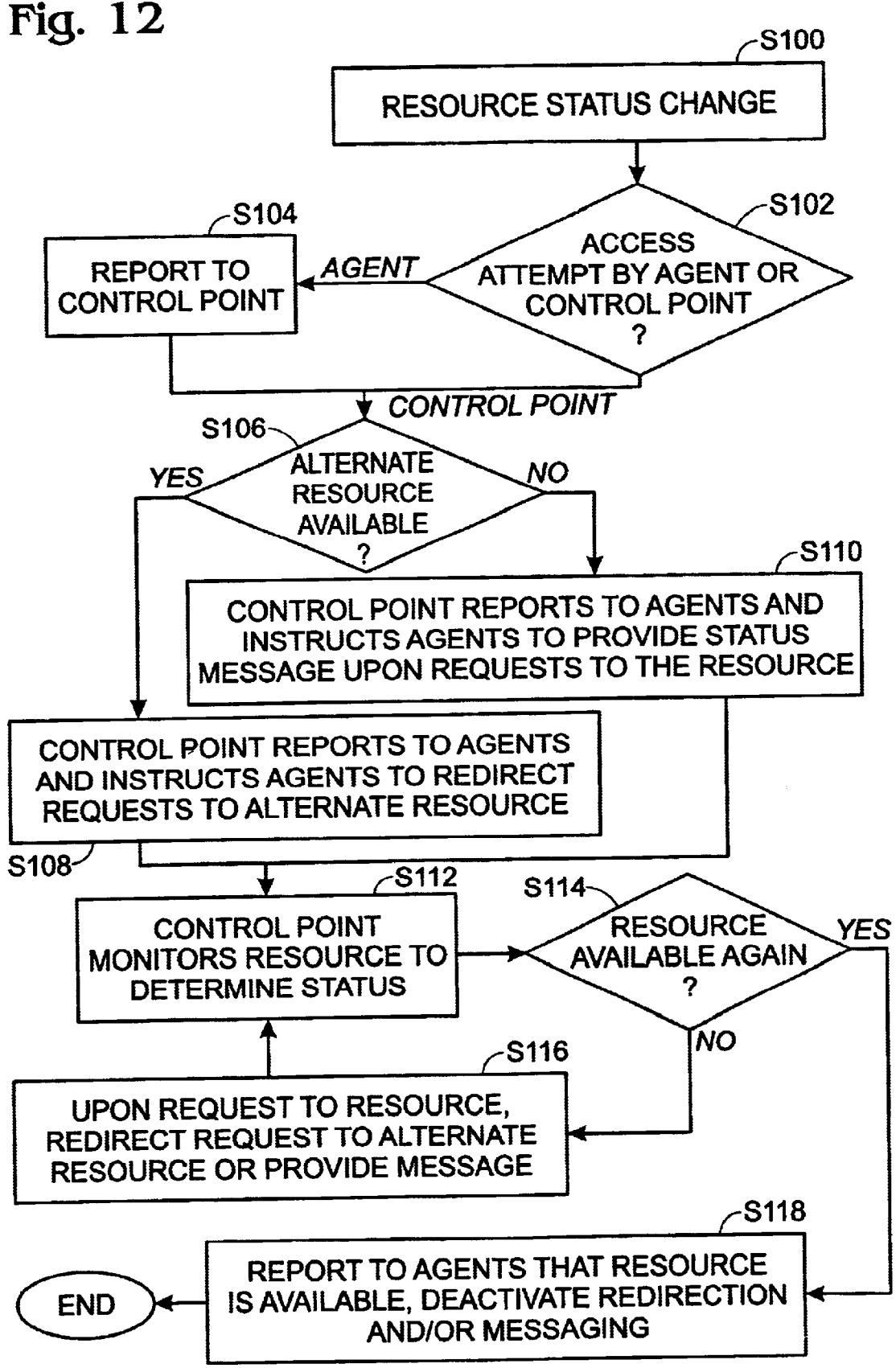
FIG. 12 is a flowchart depicting a method according to the present invention for monitoring the status of network resources.

Referring now to FIGS. 10–12, control point 72 and its functions will be more particularly described. As seen in FIG. 10, control point may include a traffic module 160, a server profile module 162, a DNS server profile module 164, a gateway profile module 166, an administrator module 168, a message broker module 170, a popapp interface 172 and a popapp 174.

Control point traffic module 160 implements policy-based, QoS techniques by coordinating the service-level enforcement activities of the agents. As part of this function, traffic module 160 dynamically allocates bandwidth among the agents in its domain by regularly obtaining allocation data from the agents, calculating bandwidth allocations for each agent based on this data, and communicating the calculated allocations to the agents for enforcement. For example, control point 72 can be configured to recalculate bandwidth allocations every five seconds. During each cycle, between re-allocation, the agents restrict bandwidth usage by their associated devices to the allocated amount and monitor the amount of bandwidth actually used. At the end of the cycle, each agent reports the bandwidth usage and other allocation data to the control point to be used in re-allocating bandwidth.

During re-allocation, traffic module 160 divides the total bandwidth available for the upcoming cycle among the agents within the domain according to the priority data reported by the agents. The result is a configured bandwidth CB particular to each individual agent, corresponding to that agent's fair share of the available bandwidth. The priorities and configured bandwidths are a function of system policies, and may be based on a wide variety of parameters, including application identity, user identity, device identity, source address, destination address, source port, destination port, protocol, URL, time of day, network load, network population, and virtually any other parameter concerning network resources that can be communicated to, or obtained by the control point. The detail and specificity of client-side parameters that may be supplied to the control point is greatly enhanced in the present invention by the position of agent redirector module 130 relative to the layered communications protocol stack. The high position within the stack allows bandwidth allocation and, more generally, policy implementation, to be performed based on very specific triggering criteria. This greatly enhances the flexibility and power of the invented software, systems and methods.

The priority data reported by the agents may include priority data associated with multiple application programs running on a single networked device. In such a situation, the associated agent may be configured to report an "effective application priority," which is a function of the individual application priorities. For example, if device A were running two application programs and device B were running a single application program, device A's effective application priority would be twice that of device B, assuming that the individual priorities of all three applications were the same. The reported priority data for a device running multiple application programs may be further refined by weighting the reported priority based on the relative degree of activity for each application program. Thus, in the previous example, if one of the applications running on device A was dormant or idle, the contribution of that application to the effective priority of device A would be discounted such that, in the end, device A and device B would have nearly the same effective priority. To determine effective application priority using this weighted method, the relative degree of activity for an application may be measured in terms of bandwidth usage, transmitted packets, or any other activity-indicating criteria.

In addition to priority data, each agent may be configured to report the amount of bandwidth UB used by its associated device during the prior period, as discussed above. Data is also available for each device's allocated bandwidth AB for the previous cycle. Traffic module 160 may compare configured bandwidth CB, allocated bandwidth AB or utilized bandwidth UB for each device, or any combination of those three parameters to determine the allocations for the upcoming cycle. To summarize the three parameters, UB is the amount the networked device used in the prior cycle, AB is the maximum amount they were allowed to use, and CB specifies the device's "fair share" of available bandwidth for the upcoming cycle.

Both utilized bandwidth UB and allocated bandwidth AB may be greater than, equal to, or less than configured bandwidth CB. This may happen, for example, when there are a number of networked devices using less than their configured share CB. To efficiently utilize the available bandwidth, these unused amounts are allocated to devices requesting additional bandwidth, with the result being that some devices are allocated amount AB that exceeds their configured fair share CB. Though AB and UB may exceed CB, utilized bandwidth UB cannot normally exceed allocated bandwidth AB, because the agent traffic control module enforces the allocation.

Any number of processing algorithms may be used to compare CB, AB and UB for each agent in order to calculate a new allocation, however there are some general principles which are often employed. For example, when bandwidth is taken away from devices, it is often desirable to first reduce allocations for devices that will be least affected by the downward adjustment. Thus, traffic module 160 may be configured to first reduce allocations of clients or other devices where the associated agent reports bandwidth usage UB below the allocated amount AB. Presumably, these devices won't be affected if their allocation is reduced. Generally, traffic module 160 should not reduce any other allocation until all the unused allocations, or portions of allocations, have been reduced. The traffic module may be configured to then reduce allocations that are particularly high, or make adjustments according to some other criteria.

Traffic module 160 may also be configured so that when bandwidth becomes available, the newly-available bandwidth is provisioned according to generalized preferences. For example, the traffic module can be configured to provide surplus bandwidth first to agents that have low allocations and that are requesting additional bandwidth. After these requests are satisfied, surplus bandwidth may be apportioned according to priorities or other criteria.

FIGS. 11A, 11B, 11C and 11D depict examples of various methods that may be implemented by traffic module 160 to dynamically allocate bandwidth. FIG. 11A depicts a process by which traffic module 160 determines whether any adjustments to bandwidth allocations AB are necessary. Allocated bandwidths AB for certain agents are adjusted in at least the following circumstances. First, as seen in steps S4 and S10, certain allocated bandwidths AB are modified if the sum of all the allocated bandwidths $AB_{total}$ exceeds the sum of the configured bandwidths $CB_{total}$. This situation may occur where, for some reason, a certain portion of the total bandwidth available to the agents in a previous cycle becomes unavailable, perhaps because it has been reserved for another purpose. In such a circumstance, it is important to reduce certain allocations AB to prevent the total allocations from exceeding the total bandwidth available during the upcoming cycle.

Second, if there are any agents for which AB<CB and UB≅AB, the allocation for those agents is modified, as seen in steps S6 and S10. The allocations for any such agent are typically increased. In this situation, an agent has an allocation AB that is less than their configured bandwidth CB, i.e. their existing allocation is less than their fair share of the bandwidth that will be available in the upcoming cycle. Also, the reported usage UB for the prior cycle is at or near the enforced allocation AB, and it can thus be assumed that more bandwidth would be consumed by the associated device if its allocation AB were increased.

Third, if there are any agents reporting bandwidth usage UB that is less than their allocation AB, as determined at step S8, then the allocation AB for such an agent is reduced for the upcoming period to free up the unused bandwidth. Steps S4, S6 and S8 may be performed in any suitable order. Collectively, these three steps ensure that certain bandwidth allocations are modified, i.e. increased or reduced, if one or more of the following three conditions are true: (1) $AB_{total} > CB_{total}$, (2) AB<CB and UB≅AB for any agent, or (3) UB<AB for any agent. If none of these are true, the allocations AB from the prior period are not adjusted. Traffic module 160 modifies allocations AB as necessary at step S10. After all necessary modifications are made, the control point communicates the new allocations to the agents for enforcement during the upcoming cycle.

FIG. 11B depicts re-allocation of bandwidth to ensure that total allocations AB do not exceed the total bandwidth available for the upcoming cycle. At step S18, traffic module 160 has determined that the sum of allocations AB from the prior period exceed the available bandwidth for the upcoming period, i.e. $AB_{total} > CB_{total}$. In this situation, certain allocations AB must be reduced. As seen in steps S20 and S22, traffic module 160 may be configured to first reduce allocations of agents that report bandwidth usage levels below their allocated amounts, i.e. UB<AB for a particular agent. These agents are not using a portion of their allocations, and thus are unaffected or only minimally affected when the unused portion of the allocation is removed. At step S20, the traffic module first determines whether there are any such agents. At step S22, the allocations AB for some or all of these agents are reduced. These reductions may be gradual, or the entire unused portion of the allocation may be removed at once.

After any and all unused allocation portions have been removed, it is possible that further reductions may be required to appropriately reduce the overall allocations $AB_{total}$. As seen in step S24, further reductions are taken from agents with existing allocations AB that are greater than configured bandwidth CB, i.e. AB>CB. In contrast to step S22, where allocations were reduced due to unused bandwidth, bandwidth is removed at step S24 from devices with existing allocations that exceed the calculated "fair share" for the upcoming cycle. As seen at step S26, the reductions taken at steps S22 and S24 may be performed until the total allocations $AB_{total}$ are less than or equal to the total available bandwidth $CB_{total}$ for the upcoming cycle.

FIG. 11C depicts a method for increasing the allocation of certain agents. As discussed with reference to FIG. 11A, where AB<CB and UB≅AB for any agent, the allocation AB for such an agent should be increased. The existence of this circumstance has been determined at step S40. To provide these agents with additional bandwidth, the allocations for certain other agents typically need to be reduced. Similar to steps S20 and S22 of FIG. 11B, unutilized bandwidth is first identified and removed (steps S42 and S44). Again, the control point may be configured to vary the rate at which unused allocation portions are removed. If reported data does not reflect unutilized bandwidth, traffic module 160 may be configured to then reduce allocations for agents having an allocation AB higher than their respective configured share CB, as seen in step S46. The bandwidth recovered in steps S44 and S46 is then provided to the agents requesting additional bandwidth. Any number of methods may be used to provision the recovered bandwidth. For example, preference may be given to agents reporting the largest discrepancy between their allocation AB and their configured share CB. Alternatively, preferences may be based on application identity, user identity, priority data, other client or system parameters, or any other suitable criteria.

FIG. 11D depicts a general method for reallocating unused bandwidth. At step S60, it has been determined that certain allocations AB are not being fully used by the respective agents, i.e. UB<AB for at least one agent. At step S62, the allocations AB for these agents are reduced. As with the reductions and modifications described with reference to FIGS. 11A, 11B and 11C, the rate of the adjustment may be varied through configuration changes to the control point. For example, it may be desired that only a fraction of unused bandwidth be removed during a single reallocation cycle. Alternatively, the entire unused portion may be removed and reallocated during the reallocation cycle.

In step S64 of FIG. 11D, the recovered amounts are provisioned as necessary. The recovered bandwidth may be used to eliminate a discrepancy between the total allocations $AB_{total}$ and the available bandwidth, as in FIG. 11B, or to increase allocations of agents who are requesting additional bandwidth and have relatively low allocations, as in FIG. 11C. In addition, if there is enough bandwidth recovered, allocations may be increased for agents requesting additional bandwidth, i.e. UB≅AB, even where the current allocation AB for such an agent is fairly high, e.g. AB>CB. As with the methods depicted in FIGS. 11B and 11C, the recovered bandwidth may be reallocated using a variety of methods and according to any suitable criteria.

As indicated, traffic module 160 can be configured to vary the rate at which the above allocation adjustments are made. For example, assume that a particular device is allocated 64 KBps (AB) and reports usage during the prior cycle of 62 KBps (UB). Traffic module 160 cannot determine how much additional bandwidth the device would use. Thus, if the allocation were dramatically increased, say doubled, it is possible that a significant portion of the increase would go unused. However, because the device is using an amount roughly equal to the enforced allocation AB, it can be assumed that the device would use more if the allocation were increased. Thus, it is often preferable to provide small, incremental increases. The amount of these incremental adjustments and the rate at which they are made may be configured with the configuration utility, as will be discussed with reference to FIG. 16. If the device consumes the additional amounts, successive increases can be provided if additional bandwidth is available.

In addition, the bandwidth allocations and calculations may be performed separately for the transmit and receive rates for the networked devices. In other words, the methods described with reference to FIGS. 11A–11D may be used to calculate a transmit allocation for a particular device, as well as a separate receive allocation. Alternatively, the calculations may be combined to yield an overall bandwidth allocation.

Server profile module 162, DNS server profile module 164, gateway profile module 166 and administrator module 168 all interact with the agents to monitor the status of network resources. More specifically, FIG. 12 provides an illustrative example of how the control points and agents may be configured to monitor the status of resources on the network. The monitored resource(s) may be a server, a DNS server, a router, gateway, switch, application, etc. At step S100, a resource status change has occurred. For example, a server has gone down, traffic through a router has dramatically increased, a particular application is unavailable, or the performance of a particular gateway has degraded beyond a predetermined threshold specified in a system policy.

At step S102, a networked device attempts to access the resource or otherwise engages in activity on the network involving the particular resource. If the accessing or requesting device is an agent, an executable spawned by popapp module 138 (FIG. 9) analyzes the resource, and reports the identity and status of the resource to the control point connected to the agent, as indicated at step S104. Launch of the popapp may be triggered by connection errors, or by triggering criteria specified in system policies. For example, system policies may include performance benchmarks for various network resources, and may further specify that popapp analysis is to be performed when resource performance deviates by a certain amount from the established benchmark. In addition, the control points may similarly be configured to launch popapps to analyze network resources.

Once the control point obtains the status information, the control point reports the information to all of the agents in its domain, and instructs the agents how to handle further client requests involving the resource, as indicated at steps S108 and S110. In the event that the target resource is down, underperforming or otherwise unavailable, the instructions given to the agents will depend on whether an alternate resource is available. The control point stores dynamically updated lists of alternate available resources. If an alternate resource is available, the instructions provided to the agent may include an instruction to transparently redirect the request to an alternate resource, as shown in step S108. For example, if the control point knows of a server that mirrors the data of another server that has gone down, client requests to the down server can simply be redirected to the mirror server. Alternatively, if no alternate resource is available, the agent can be instructed to provide a user message in the event of an access attempt, as seen in step S110. The messaging function is handled by agent popapp module 138. In addition, popapp functionality may be employed by the control point to report status information to other control points and management platforms supplied by other vendors. In addition, messages concerning resource status or network conditions may be provided via email or paging to IT personnel.

Still referring to FIG. 12, the control point may be configured to assume responsibility for tracking the status of the resource in order to determine when it again becomes available, as shown in step S112. A slow polling technique is used to minimize unnecessary traffic on the network. During the interval in which the resource is unavailable, the agents either redirect requests to the resources or provide error messages, based on the instructions provided by the control point, as shown in step S116. Once the control point determines that the resource is again available, the control point shares this information with the agents and disables the instructions provided in steps S108 and S110, as shown in step S118.

This method of tracking and monitoring resource status has important advantages. First, it reduces unnecessary and frustrating access attempts to unavailable resources. Instead of repeatedly attempting to perform a task, a user's requests are redirected so that the request can be serviced successfully, or the user is provided with information about why the attempt(s) was unsuccessful. With this information in hand, the user is less likely to generate wasteful network traffic with repeated access attempts in a short period of time. In addition, network traffic is also reduced by having only one entity, usually a control point, assume responsibility for monitoring a resource that is unavailable.

In addition to assisting these resource monitoring functions, server profile module 162 maintains a dynamically updated list of the servers accessed by agents within its domain. The server statistics may be retrieved using the configuration utility, or with a variety of other existing management platforms. The server statistics may be used for network planning, or may be implemented into various system policies for dynamic enforcement by the agents and control points. For example, the control points and agents can be configured to divert traffic from heavily used servers or other resources.

DNS module 164 also performs certain particularized functions in addition to aiding the resource monitoring and tracking described with reference to FIG. 12. Specifically, the DNS module maintains a local DNS cache for efficient local address resolution. As discussed with reference to agent DNS module 136, the agents and control points interact to resolve address requests, and may be configured to resolve addresses by first referencing local DNS data maintained by the agents and/or control points. Similar to server profile module 162, DNS module 164 also maintains statistics for use in network planning and dynamic system policies.

In addition to the functions described above, administrator module 168 maintains control point configuration parameters and distributes this information to the agents within the domain. Similar to the server, DNS and gateway modules, administrator module 168 also aids in collecting and maintaining statistical data concerning network resources. In addition, administrator module 168 retrieves policy data from centralized policy repositories, and stores the policy data locally for use by the control points and agents in enforcing system policies.

Control point 72 also includes a synchronization interface (not shown) for synchronizing information among multiple control points within the same domain.

Message broker module 170 performs various functions to enable the control point to communicate with the agents. Similar to agent message broker module 140, message broker module 170 includes message creator and message dispatcher processes. The message creator process includes member functions that receive message contents as parameters and return encoded messages for transmission to agents and other network entities. Functions for decoding received messages are also included with the message creator process. The dispatcher process transmits messages and ensures reliable delivery through a retry mechanism and error detection and recovery methods.

Referring now to FIGS. 13–16, both the agents and control points may be configured using configuration utility 106. Typically, configuration utility 106 is a platform-independent application that provides a graphical user interface for centrally managing configuration information for the control points and agents. To configure the control points and agents, the configuration utility interface with administrator module 134 of agent 70 and with administrator module 168 of control point 72. Alternatively, configuration utility 106 may interface with administrator module 168 of control point 72, and the control point in turn may interface with administrator module 134 of agent 70.

Figure 13:
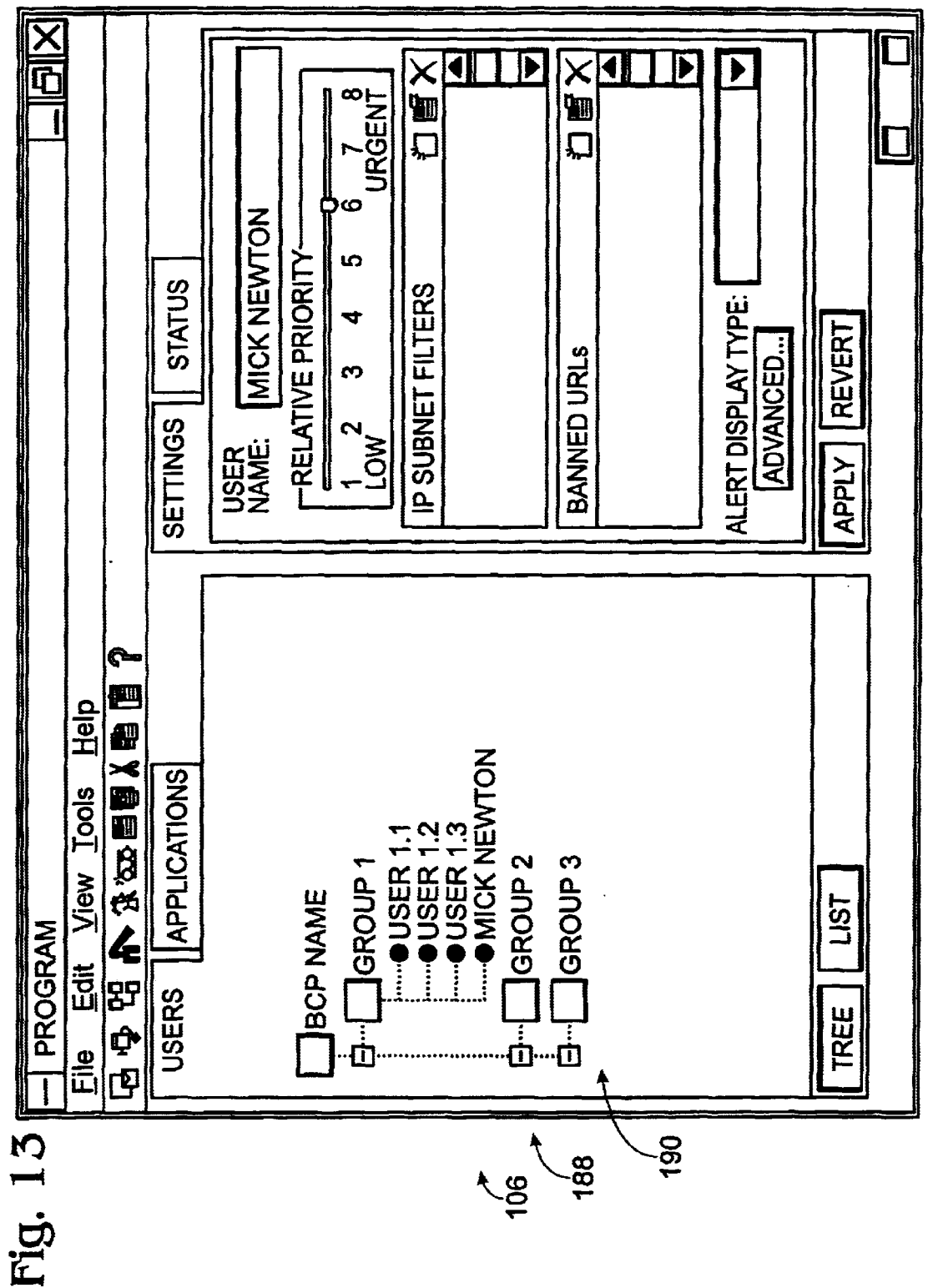
FIG. 13 is a view of a main configuration screen of a configuration utility according to the present invention.

FIG. 13 depicts a main configuration screen 188 of configuration utility 106. As indicated, main configuration screen 188 can be used to view various objects managed by the invented software, systems and methods, including users, applications, control points, agents and other network entities and resources. For example, screen frame 190 on the left side of the main configuration screen 188 may be used to present an expandable representation of the control points that are configured for the network.

When a particular control point is selected in the main configuration screen 188, various settings for the control point may be configured. For example, the name of the control point may be edited, agents and other entities may be added to the control point's domain, and the control point may be designated as a secondary connection for particular agents or groups of agents. In addition, the system administrator may specify the total bandwidth available to agents within the control point's domain for transmitting and receiving, as shown in FIG. 14. This bandwidth specification will affect the configured bandwidths CB and allocated bandwidths AB discussed with reference to control point traffic module 160 and the method depicted in FIG. 11.

Configuration utility 106 also provides for configuration of various settings relating to users, applications and resources associated with a particular control point. For example, users may be grouped together for collective treatment, lists of prohibited URLs may be specified for particular users or groups of users, and priorities for applications may be specified, as shown in FIG. 15. Priorities may also be assigned to users or groups of users. As discussed above, this priority data plays a role in determining bandwidth allocations for the agents and their associated devices.

In addition, optimum and minimum performance levels may be established for applications or other tasks using network resources. Referring again to the IP telephony example discussed above, the configuration utility may be used to specify a minimum threshold performance level for a networked device running the IP telephony application. This performance level may be specified in terms of QoS performance parameters such as bandwidth, throughput, jitter, delay and loss. The agent module associated with the networked device would then monitor the network traffic associated with the IP telephony application to ensure that performance was above the minimum threshold. If the minimum level was not met, the control points and agents could interact to reallocate resources and provide the specified minimum service level. Similarly, an optimum service level may be specified for various network applications and tasks. More generally, configuration utility 106 may be configured to manage system policies by providing functionality for authoring, maintaining and storing system policies, and for managing retrieval of system policies from other locations on a distributed network, such as a dedicated policy server.

Referring now to FIG. 16, the configuration of various other control point and agent parameters will be discussed. As seen in the figure, configuration utility 106 may be used to configure the interval at which resource reallocation is performed. For example, the default interval for recalculating bandwidth allocations is 5000 milliseconds, or 5 seconds. Also, as discussed above, the rate at which resource allocation occurs may be specified in order to prevent overcompensation, unnecessary adjustments to allocations, and inefficient reconfigurations. Specifically, the percentage of over-utilized bandwidth that is removed from a client device and reallocated elsewhere may be specified with the configuration utility, as seen in FIG. 16. In addition, the rate at which agents provide feedback to the control points regarding network conditions or activities of their associated devices may be configured.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A system for dynamically allocating bandwidth among a plurality of distributed client computers interconnected by a network link, comprising:

a plurality of agents, each agent being associated with one of the plurality of distributed client computers; and a control module, wherein the agents are adapted to repeatedly communicate bandwidth allocation data for the distributed client computers to the control module;

in response to the bandwidth allocation data communicated by the agents, the control module is adapted to dynamically calculate a bandwidth allocation for each of the distributed client computers and communicate the calculated bandwidth allocation to the agent associated with the respective distributed client computer; and each agent is adapted to receive the calculated bandwidth allocation for its associated distributed client computer from the control module and restrict bandwidth usage by the distributed client computer to the calculated allocation, the control module being adapted to dynamically allocate bandwidth by:

apportioning available bandwidth to determine a configured bandwidth share for each distributed client computer during an upcoming time period;

obtaining a prior bandwidth allocation for each distributed client computer, wherein the prior bandwidth allocation is an amount of bandwidth allotted to each distributed client computer during a prior period;

obtaining a utilized bandwidth for each distributed client computer, wherein the utilized bandwidth is an amount of bandwidth used by each distributed client computer during the prior period; and comparing the configured bandwidth share, prior bandwidth allocation and utilized bandwidth for each distributed client computer to determine an upcoming bandwidth allocation for each distributed client computer for the upcoming period.

2. The system of claim 1, wherein if the utilized bandwidth is less than the prior bandwidth allocation for any of the distributed client computers, the upcoming allocation for such distributed client computer is determined by reducing the prior bandwidth allocation for such distributed client computer.

3. The system of claim 1, wherein if the prior bandwidth allocation is less than the configured bandwidth share for any of the distributed client computers, and if the utilized bandwidth is substantially equal to the prior bandwidth allocation for any such distributed client computer, the upcoming allocation for such distributed client computer is determined by increasing the prior bandwidth allocation for such distributed client computer.

4. A method of dynamically allocating bandwidth to a plurality of distributed client computers connected to a network, comprising the steps of:

periodically obtaining bandwidth allocation data for each of the distributed client computers;

dynamically calculating a bandwidth allocation for each of the distributed client computers based on the bandwidth allocation data; and controlling network access of each of the distributed client computers to limit network bandwidth usage of each of the distributed client computers to the calculated bandwidth allocations, where such control is achieved through operation of an agent software module loaded into memory of each of the distributed client computers, wherein the step of dynamically calculating a bandwidth allocation for each of the distributed client computers is performed by:

apportioning available bandwidth to determine a configured bandwidth share for each distributed client computer during an upcoming time period;

obtaining a prior bandwidth allocation for each distributed client computer, wherein the prior bandwidth allocation is an amount of bandwidth allotted to each distributed client computer during a prior period;

obtaining a utilized bandwidth for each distributed client computer, wherein utilized bandwidth is an amount of bandwidth used by each distributed client computer during the prior period; and comparing the configured bandwidth share, prior bandwidth allocation and utilized bandwidth for each distributed client computer to determine a bandwidth allocation for each distributed client computer for the upcoming period.

5. The method of claim 4, wherein if the utilized bandwidth is less than the prior bandwidth allocation for any of the distributed client computers, the upcoming allocation for such distributed client computer is determined by reducing the prior bandwidth allocation for such distributed client computer.

6. The method of claim 4, wherein if the prior bandwidth allocation is less than the configured bandwidth share for any of the distributed client computers, and if the utilized bandwidth is substantially equal to the prior bandwidth allocation for any such distributed client computer, the upcoming allocation for such distributed client computer is determined by increasing the prior bandwidth allocation for such distributed client computer.

7. A system for dynamically allocating bandwidth among a plurality of distributed client computers interconnected by a network link, comprising:

a plurality of agents, each agent being associated with one of the plurality of distributed client computers and adapted to monitor and control its associated distributed client computer by interfacing with a socket object used to operatively couple the network link with application programs running on the associated distributed client computer; and a control module, wherein:

the agents are adapted to communicate bandwidth usage data for the distributed client computers to the control module;

the control module is adapted to dynamically calculate a bandwidth allocation for each of the agents in response to the bandwidth usage data; and each agent is adapted to interface with the socket object actively restrict bandwidth usage on the network link by its associated distributed client computer in accordance with the bandwidth allocation calculated for that agent, wherein the control module is adapted to dynamically allocate bandwidth by:

apportioning available bandwidth to determine a configured bandwidth share for each distributed client computer during an upcoming time period;

obtaining a prior bandwidth allocation for each distributed client computer, wherein the prior bandwidth allocation is an amount of bandwidth allotted to each distributed client computer during a prior period;

obtaining a utilized bandwidth for each distributed client computer, wherein the utilized bandwidth is an amount of bandwidth used by each computer during the prior period; and comparing the configured bandwidth share, prior bandwidth allocation and utilized bandwidth for each distributed client computer to determine an upcoming bandwidth allocation for each distributed client computer for the upcoming period.

* * * * *